US006438515B1

(12) United States Patent
Crawford et al.

(10) Patent No.: US 6,438,515 B1
(45) Date of Patent: Aug. 20, 2002

(54) BITEXTUAL, BIFOCAL LANGUAGE LEARNING SYSTEM

(76) Inventors: Richard Henry Dana Crawford, P.O. Box 261062, Los Angeles, CA (US) 90026; Urivan A. Saaib, Calle 4ta y Miramar, Col. Plaza La Jolla, Dept. 203, 22880 Ensenada, BC (MX)

( * ) Notice: Subject to any disclaimer, the term of this patent is extended or adjusted under 35 U.S.C. 154(b) by 0 days.

(21) Appl. No.: 09/340,756

(22) Filed: Jun. 28, 1999

(51) Int. Cl.[7] .............................................. G06F 17/28
(52) U.S. Cl. ......................................... 704/5; 434/157
(58) Field of Search ........................ 704/2–7; 434/156, 434/157; 430/296; 359/15

(56) References Cited

U.S. PATENT DOCUMENTS

| | | | | |
|---|---|---|---|---|
| 4,791,587 A | * | 12/1988 | Doi ................................ 794/2 |
| 4,891,011 A | * | 1/1990 | Cook ........................... 345/167 |
| 5,145,376 A | * | 9/1992 | Krass .......................... 345/167 |
| 5,178,542 A | * | 1/1993 | Chgrinsky et al. ........... 434/157 |
| 5,275,569 A | * | 1/1994 | Watkins ....................... 345/167 |
| 5,486,111 A | * | 1/1996 | Watkins ....................... 435/167 |
| 5,697,789 A | * | 12/1997 | Sameth et al. .............. 434/157 |
| 5,713,739 A | * | 2/1998 | Yu .............................. 434/157 |

* cited by examiner

*Primary Examiner*—Patrick N. Edouard
(74) *Attorney, Agent, or Firm*—Russo & Hale LLP; William C. Milks, III

(57) ABSTRACT

A method and apparatus for displaying dual texts in a manner to facilitate language learning, by presenting a highly visible "study text," divided into individual units of thought, or "chunks of meaning," which are preferably formatted in association with less visible units of a "teach text," provided in proximity, preferably upon a separate focal plane, thus effecting a bitextual, bifocal presentation. The method and apparatus clearly relate the study text and the teach text, associating their individually related chunks of meaning, storing these associations in computer memory, as ".txt" or "Unicode equivalent" files, which, when organized into folders, allow computer programs to access these associations and automatically produce bitextual, preferably bifocal, presentations. These presentations can preferably be accessed in publications printed on paper, such as in books and magazines, and can also be accessed by users over a computer network, such as the Internet, and displayed.

25 Claims, 6 Drawing Sheets

English/Español/ANY_TEXT.btx — 343

22
33

Each new chunk goes under the chunk
CADA TROZO NUEVO    SE PONE DEBAJO DE    EL TROZO DE -
before. A new sentence begins after one
ANTES    UNA FRASE NUEVA    EMPIEZA    DESPUES DE    UNA
empty line.
LINEA VACIA A new paragraph starts after two empty
UN PARAGRAFO NUEVO    EMPIEZA DESPUES DE    DOS LINEAS VA-
lines. Even a single word can be divided
CIAS    AUN    UNA PALABRA SOLA    PUEDE ESTAR    DOS    APARTADA
into chunks.
EN TROZOS

333

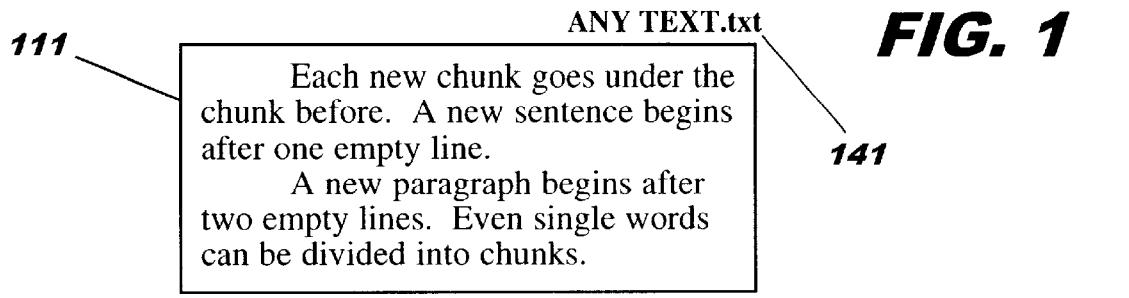
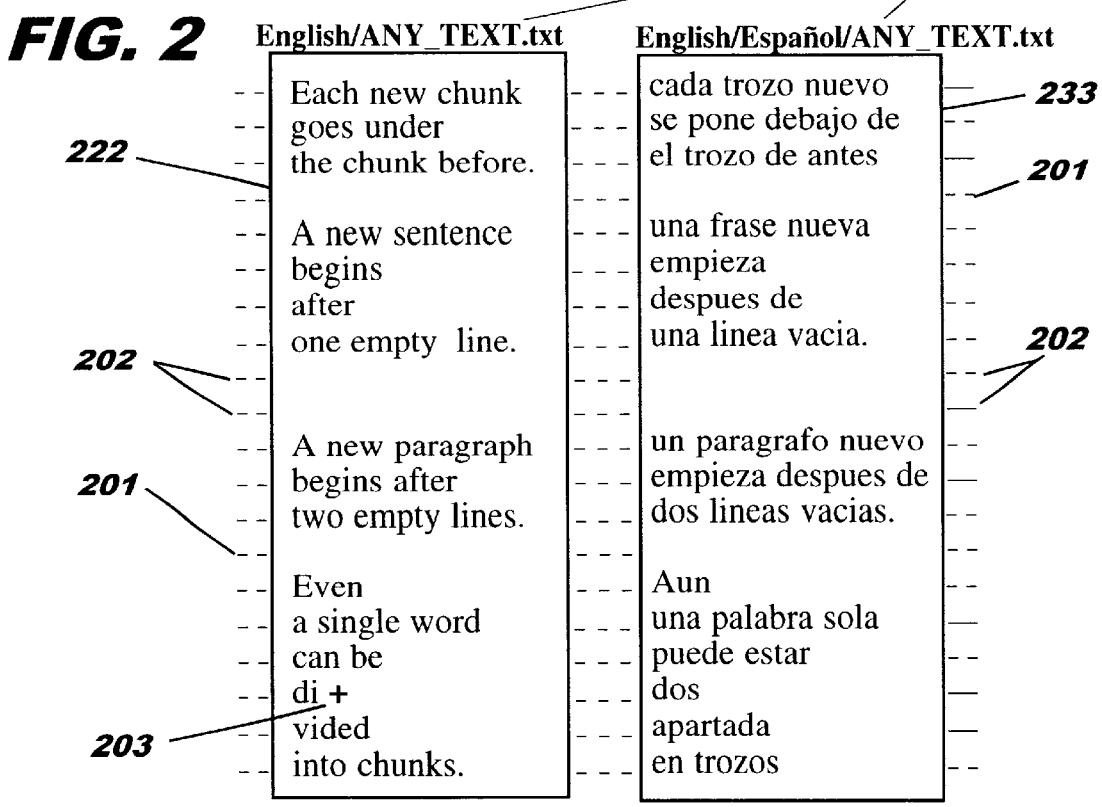
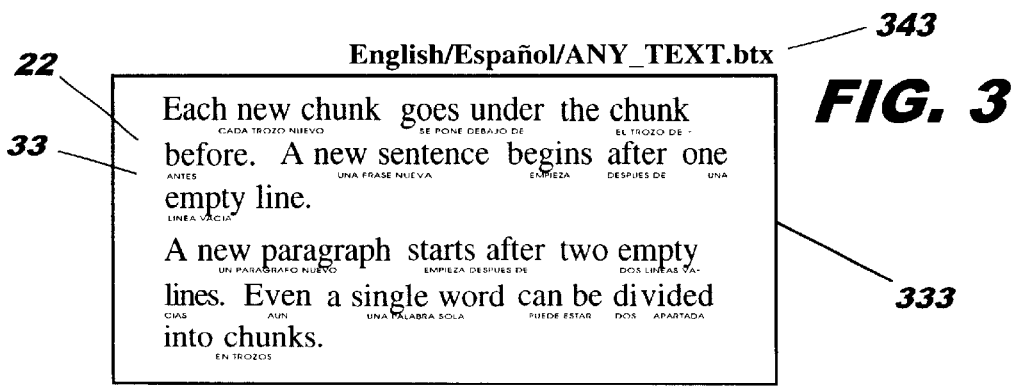

BITEXTUAL, BIFOCAL LANGUAGE LEARNING SYSTEM

FIELD OF THE INVENTION

The present invention relates to education and, more particularly, to educational learning aids. Specifically, one embodiment of the present invention provides an apparatus and method to aid learning a language. More specifically, one embodiment in accordance with the present invention helps a person to learn a new language by providing a format which compares units of thought, or "chunks," of a "study text" for the new language to be learned with a "teach text" for a known language presented in a "bifocal" arrangement and by providing a system to easily create and distribute such "bitextual" presentations via a computer network, such as the Internet, thereby enabling the presentations to be published on a variety of media, including electronic displays and/or paper publications, such as magazines and books.

BACKGROUND OF THE INVENTION

In an era of globalization, the learning of new or "foreign" languages is becoming increasingly useful. Conversing in a common language can help people to communicate and to exchange valuable information in an evolving multicultural and global society.

Learning a new language is a challenging task, requiring a student to understand a wide variety of new words, phrases, idioms, and grammatical constructs, all of which are framed within the context of an unfamiliar culture. Various learning aids are known to help learn a new language, but known learning aids have various shortcomings.

Typically, when studying a text in a new language, a student often uses a dictionary to look up the meaning of new words and phrases. However, due to variable slangs and idioms, these dictionaries at times provide misleading literal interpretations, unsuited to the context of a particular usage of a word or phrase.

Additionally, students often use "parallel text" translations. Parallel text typically provides a foreign text on one page, with a corresponding translation on an opposite or facing page in a printed book, or can also be represented in two separate columns, typically on the same page. A parallel text presentation permits a student to compare a foreign text with a translated text in a known language.

Parallel text helps a student learn parts of a new language, allowing him or her to compare a text to its translation, but can be difficult to use. The student, when faced with a new language usage she or he does not understand, is forced to stop at the new usage, refer to the understood text, find the corresponding word or phrase within the corresponding paragraph, then return to the text of the language being learned, find the location of the usage in question, and then apply the corresponding translation within that context.

Several presentations have attempted to streamline this cumbersome approach by offering a dual text format which locates a supplementable foreign text conveniently adjacent to an explanatory translation text. As evidenced by the prior art, such dual text presentations are typically limited to translations of individual words, rather than interrelated groups of words.

The problem with these dual text presentations is that, while a reader intends to focus on the foreign text, his or her eyes are likely to stray to the adjacently provided translation text. Consequently, a student habitually relies on this conveniently located translation text, rather than effectively learning the foreign text.

U.S. Pat. No. 4,891,011 to Cook accurately portrays the problem inherent in typical dual text presentations. An interlinearly arrayed presentation of a supplementable foreign text and an explanatory translation text is disclosed, with the translation text invisible to the human eye, unless exposed to ultraviolet (UV) light, requiring the use of a special flashlight.

U.S. Pat. No. 5,145,376 to Krass discloses a superimposed display of foreign text and translation text, each printed in a distinct color of ink. To make either text independently distinguishable to the human eye requires the use of special separate filters.

U.S. Pat. Nos. 5,275,569 and 5,486,111 to Watkins disclose a parallel text presentation combined with a dual text presentation, which serves to compare the variable grammar rules between languages. Four presentations are required, namely: a text from a first language; a word-for-word translation to a second language; a grammatically correct translation to the second language; and from this grammatically correct translation, a word-for-word translation back to the first language. While this wide variety of translations may help a beginning student analyze different grammatical constructions between languages, word-for-word translations restrict a translator's ability to interpret interrelated words according to the context of their usage. As students move beyond an introductory level, such word-for-word translations become less helpful. Also, although located conveniently below each word of the grammatically correct foreign source text, individual word-for-word translations often require more letters or characters, forcing disruption in the normal flow of the source text, making a dual text presentation an unsuitable solution for longer writings. In addition, the convenient proximity of the translation text information to the foreign text does not address the problem of focusing the student's attention on the foreign text to be learned.

Consequently, although some improvements to parallel text and dual text presentations have been attempted, they either require the use of special accessories, such as ultraviolet flashlights or color filters, or else they are restrictive beginners' techniques, severely limited by the narrow scope of isolated word-for-word translations which can be insensitive to variable interpretations of words or groups of words, according to their context.

None of these known techniques provides an approach to combine a "study text" and a "teach text," which relate specifically associated units of thought, or "chunks of meaning" simply referred to as "chunks," between the two texts, and then presenting the associated chunks of text "bifocally," or upon distinctly separate focal planes, thereby allowing a student to easily focus on the study text, while explicitly forcing her or him to refocus when in need of explanatory information supplied by the teach text.

None of these known techniques provides a method to relate the chunk of study text to its associated chunk of teach text when a selected chunk of the study text is interrupted by a line break, or continuation of an idea or phrase on a subsequent line of text, as forced by a limited width of a text column within a given medium of presentation.

None of these known techniques provides any approach to automate the time-consuming and repetitive task of formatting such bitextual presentations using a computer and a word-processing or page-layout program.

None of these known techniques provides any approach to use a computer program to automatically separate a study text into chunks, which can in turn be associated with chunks of teach text.

None of these known techniques provides a method to associate each meaningful chunk of study text with its specifically related chunk of teach text, and store such associations as records in computer memory, in specific locations which allow various computer programs to locate and process dual text, bitextual, or other such presentations automatically.

Nor do any of these known techniques provide a computer program, and authoring interface, offering translators and educators of various languages a system to easily create a bitextual presentation, distribute such a presentation over a global computer network, such as the Internet, and account for the usage of the presentation.

SUMMARY OF THE INVENTION

The known prior art techniques do not accomplish the objectives and advantages afforded by the various embodiments of the present invention.

One objective of the present invention is to provide means to position each associated chunk of teach text in a consistently juxtaposed adjacent relationship with respect to its associated chunk of study text, thereby eliminating the need to search for a translation, as is required in the use of parallel text.

An additional objective of the present invention is to provide means to present the texts bifocally, or to explicitly distinguish the presentation of the study text from the teach text, through manipulation of distinct sizes and/or colors for the separate texts, thereby limiting the student's ability to focus on the teach text, and thus encouraging the student to focus on the study text, thereby removing a significant limitation of dual text presentations.

A further objective of the present invention is to provide means for the student to control the legibility of the teach text, simply by adjusting the focus of her or his eyes on the bitextual, bifocal presentation.

Another objective of the present invention is to provide means to create effective bitextual presentations which requires no special apparatus, such as UV flashlights or filters, as the conspicuous presentation of the study text appears in outstandingly visible format when compared to the faint presentation of the teach text, thereby forcing the student to actively shift his or her focus when desiring the explanatory information contained in the teach text, thus preventing the student's eye from straying to and depending upon the teach text, thereby assisting the student to effectively learn the study text.

In addition, an objective of the present invention is to provide means to present study text sources of any length in a normal, readable format, as the reduced size of the teach text does not force arbitrary gaps or unnatural spaces to appear in the study text.

Another objective of the present invention is to provide a computer program and authoring interface, offering translators and educators of various languages the ability to easily create bitextual presentations, and distribute and exchange them via a computer network, such as the Internet.

A further objective of the present invention is to provide a method to allow educators and translators to use any basic word processing program and a database on a computer to associate a specific chunk of supplementable study text with individually related explanatory teach text, thereby allowing various computer programs to locate and access these associations, and thus produce bitextual presentations, according either to the techniques described in the prior art, or preferably according to the bitextual, bifocal presentation in accordance with the present invention.

Still another objective of the present invention is to provide means to relate the teach text to the study text when a chunk of meaning is interrupted by a line break, or a need to continue the study text on a subsequent line, due to special limitations inherent in the selected medium of presentation.

A further objective of the present invention is to provide means to effect a presentation specifically tailored for a student learning a language embodied in the study text. Where parallel text offers a cumbersome learning tool for students of either of the languages presented, the present invention more effectively focuses on the particular needs of the student familiar with the language embodied in the teach text, while gradually learning new language embodied in the study text.

Accordingly, one embodiment of the present invention provides an apparatus and method for displaying dual texts in a manner to facilitate language learning, by presenting a highly visible study text, divided into individual units of thought, or chunks of meaning, which are preferably formatted in association with less visible units of a teach text, provided in proximity, preferably upon a separate focal plane, thus effecting a bitextual, bifocal presentation. The apparatus and method clearly relate the study text and the teach text, associating their individually related chunks of meaning, storing these associations in computer memory, preferably as ".txt" or "Unicode equivalent" files, which, when organized into folders, allow computer programs to access these associations and automatically produce bitextual, preferably bifocal, presentations. These presentations can preferably be accessed by users over a computer network, such as the Internet, as well as printed on paper and distributed in books and magazines, and the like.

BRIEF DESCRIPTION OF THE DRAWINGS

Further objects and advantages of the present invention will become apparent from a consideration of the drawings and ensuing detailed description.

FIG. 1 shows a ".txt," or text file, containing text and capable of being stored in computer memory;

FIG. 2 shows a method in accordance with one embodiment of the present invention for associating chunks of the supplementable study text shown in FIG. 1 with corresponding chunks of an explanatory teach text;

FIG. 3 illustrates the associated chunks of supplementable study text with corresponding explanatory chunks of teach text shown in FIG. 2 presented on separate focal planes, or bifocally, in accordance with one embodiment of the present invention;

DETAILED DESCRIPTION OF THE PREFERRED EMBODIMENTS

A general depiction of one embodiment of the present invention is shown by the illustration provided in FIG. 3. The illustration is slightly enlarged to assure legibility. This enlargement applies equally to a study text 22 and to a teach text 33, and hence does not affect their proportions in relation to one another. When reduced to a smaller scale, the proportions more effectively achieve the objectives of the present invention. It should also be noted that, although FIG. 3 presents the teach text 33 in black, to represent a bitextual, bifocal presentation 333 of the present invention as a presentation in black and white, the teach text preferably appears in a light shade or density in comparison to the study text 22, for example, with 2% to 50% of the darkness or density of the study text. In other words, the shade or density of the study text 22 preferably ranges from two times to fifty times darker or denser than the teach text 33, and thus further enhances the method of bitextual, bifocal presentation in accordance with the present invention.

Considered in more detail, FIG. 3 shows the bitextual, bifocal presentation 333, which includes a relatively large and clearly visible study text 22 and is supplemented by an interlinearly arrayed teach text 33 that is proportionately smaller in size and, consequently, less visible in comparison to the study text. That is, the teach text 33 is presented upon a different focal plane than the study text 22, thus forming a bifocal presentation.

The larger study text 22 is formatted much as a typical single text presentation, without unusual spaces between the words. The smaller, interlinearly arrayed teach text 33, meanwhile, tends to have large spaces between specific groups of words, phrases, or idioms, or "chunks of meaning." This is due to the fact that each chunk of the teach text 33 is preferably centered directly below each associated chunk of the study text 22, and to the fact that the teach text is also preferably smaller than the study text.

As shown in FIG. 3, English is used as a representative study text 22, although a similar meaning expressed in any language represented in horizontally written text could be used. For learning a study text 22 of a language which is customarily written in a vertical format, a vertical presentation is preferable.

Also, as shown in FIG. 3, Spanish is used as a representative teach text 33, although any language represented in horizontally written text could be used. If the study text 22 represents words in a typically vertically formatted language, then the teach text 33 is also preferably presented in a vertical format.

Figure 4:
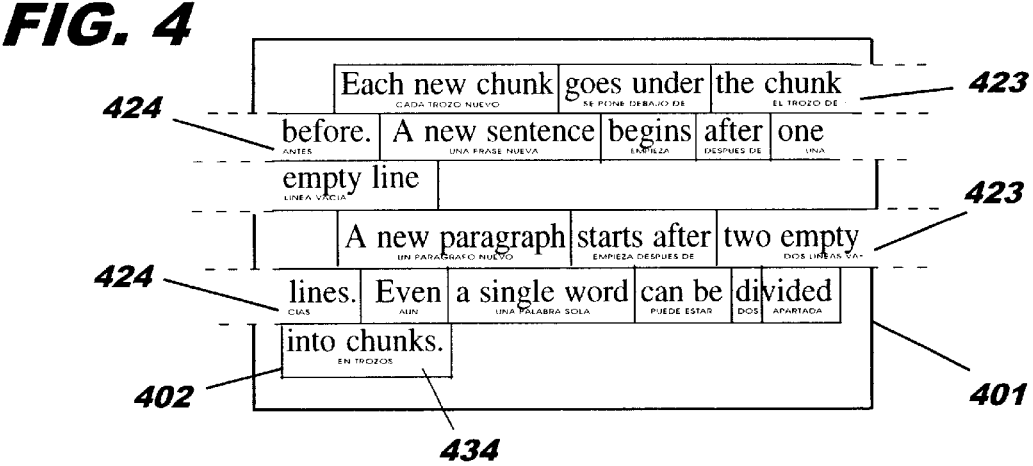
FIG. 4 illustrates the bitextual, bifocal presentation shown in FIG. 3 with lines added to identify the associated chunks of text and illustrates chunks associated when interrupted by line breaks.

FIG. 4 shows the same bitextual, bifocal presentation 333 illustrated in FIG. 3, with an overlay of frame lines 402. The frame lines 402 do not typically appear in the format of the bitextual, bifocal presentation 333 of the present invention, but serve here to identify how the study text 22 can be organized into separable units of thought, which may be expressed as words, or as groups of interrelated words, comprising phrases or idioms, that constitute "chunks of meaning."

The frame lines 402 shown in FIG. 4 serve to illustrate how each chunk of the smaller teach text 33 is typically centered directly below its associated chunk of larger study text 22. When a limited width of a given medium of presentation forces a chunk of study text 22 to be interrupted by a line break 423, then the associated chunk of teach text 33 below it is preferably aligned to the right edge of this interrupted chunk of study text, and when continued in a subsequent line 424, the teach text below is aligned to the left edge of the continuation of the interrupted chunk of study text. Consequently, if the line break 423 and its continuation upon the subsequent line 424 were to be reassembled upon a single line, the teach text 33 would be centered directly under its associated chunk of study text 22.

Figure 5:
FIG. 5 is an enlarged view of a single chunk of a bitextual, bifocal presentation, where the explanatory teach text appears much smaller.

FIG. 5 illustrates a single chunk of a bitextual, bifocal presentation 333, which relates a single chunk of large study text 22 with a single chunk of small teach text 33. When the presentation illustrated in FIG. 5 is reduced to a scale more typical to text found in printed publications or on computer displays, and includes the preferred prescribed color density balance and/or color difference between the study text 22 and the teach text 33, the object of the present invention is achieved with greater effectiveness.

The relative attributes of the study text 22 and the teach text 33 will now be described in more detail. Preferably, the height of characters comprising the study text 22 and the height of the characters comprising the teach text 33 are different.

The height of the teach text 33, in comparison to the study text 22, is preferably shorter. Equal units of height 561 shown in FIG. 5 illustrate that, in the illustrated example, the dark study text 22 is six times taller than the light teach text 33 and centered directly below it. For typical presentations in books, the preferred comparative height ratio between the teach text 33 and the study text 22 ranges from 1:3 to 1:9. That is, the study text 22 preferably appears at a multiple of from three to nine times taller than the teach text 33. In the prior art, as referenced above, the comparative height ratios are far less pronounced, measuring 1:2, that is to say, the text of the language being learned is a multiple of two times larger, or even 1:1, that is to say, the same size, as the translation and consequently does not provide a bifocal presentation which forces a student reading the study text 22 to refocus in order to read the teach text 33.

If the comparative height ratio of at least 1:3 is not able to be achieved, then a difference in color density or color, as described below, becomes an increasingly effective attribute in achieving the objective of the present invention. Preferably, the color density or color of the characters comprising the study text 22 and the color density or color of the characters comprising the teach text 33 are different.

Figure 6:
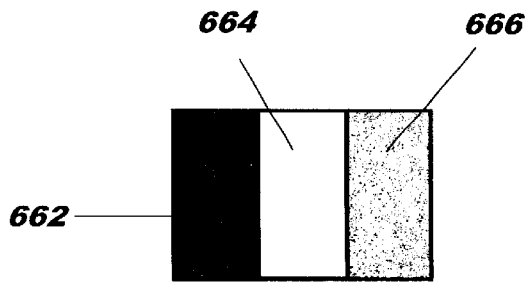
FIG. 6 shows a legend identifying black, white, and a 2% to 50% density color, such as "non-photo" blue, as three colors used in a preferred bitextual, bifocal presentation.

FIG. 6 shows a legend identifying three basic colors used for a preferred embodiment of the present invention. A blank or white area 664 between a black area 662 and a shaded area 666 represents the color of the medium upon which the bitextual, bifocal presentation 333 is provided. The solid black area 662 indicates a black or dark blue color, and represents a preferred color for presentation of the study text 22. The shaded area 666, in general, represents a light shade of gray or "non-photo" variety of blue color, with a density or darkness which ranges from 2% to 50% of that of the solid black or dark blue area 662. One preferred embodiment of this shaded area 666 can be a non-photographically reproducible or "non-photo" shade of blue. This shaded area 666 represents the preferred color density or color for presentation of the teach text 33. If the preferred prescription for color cannot be achieved, for example, if the medium for presentation is limited to black text on light colored or white paper, then, assuming a preferred height ratio of at least 1:3 is achieved, as described above, the bitextual, bifocal presentation 333 in accordance with the present invention can still be achieved, although with less efficacy.

Also, particular users will have individual preferences regarding the balance of color densities or color differences between the study text 22 and the teach text 33. In general, however, if the medium on which the bitextual, bifocal presentation 333 appears is a light-colored background, such as a white background, and the study text 22 is normalized to have a 100% density or dark shade or value, the teach text 33 preferably has, in relation to the dark study text, a 2% to 50% proportion of density, shade, or value. Consequently, the study text 22 appears in a color density and/or color that is from two times to fifty times darker and more visible than the teach text 33 in the case that the background is light.

Note that in FIG. 5, in a case in which the study text 22 and the teach text 33 overlap, as indicated by the numeral 523, the light color 666 of the teach text preferably overlaps or appears on top of the dark color 662 of the study text. Alternatively, the teach text 33 can appear farther below the study text 22 to reduce such conflicts, but less study text per page will be accommodated within the height limitation of a given medium.

While millions of functional color combinations are possible, a preferred embodiment is described here. When appearing against a light-colored background, such as a white background, the color of the teach text 33 is, in general, preferably a very light shade of gray or any color, and in particular, a light shade of blue, such as the "non-photo" variety of blue, as indicated by the numeral 666 in FIG. 6. The color of the study text 22, in comparison, is relatively dark, preferably a dark blue or jet black, color 662. This assumes that the dual texts appear together on a white background 664. On the other hand, if the color of the background is dark-colored, such as a black background, the study text 22 is preferably white or has a 2% to 50% proportion of density, shade, or value relative to the density, shade, or value of the teach text 33. That is, the teach text 33 appears in a density that is from two times to fifty times darker and less visible than the study text 22 in the case that the background is dark, such as in an inverse video presentation.

FIG. 1 shows a sample text 111, which contains characters or letters assembled in a specific order that are generally understood to symbolize words that communicate ideas in a given language. While the sample text 111 is in English, it could be any language organized into words, groups of words, sentences, and paragraphs, or their closest equivalents to such grammatical structures.

The sample text 111 here represents a digital record of written language which is capable of being manipulated and stored in computer memory, and identified by a specific file name 141. For example, as shown in FIG. 1, the file name can be "ANY TEXT.txt".

FIG. 2 illustrates a similar text to the sample text 111 shown in FIG. 1. While the word order within a study text source 222 is consistent with the sample text 111, the words have been rearranged into a comparatively vertical presentation. Each new unit of thought, such as a syllable, a word, a group of words, or other "chunk of meaning," is arranged on a new and subsequent line.

To the right of the study text source 222 is a teach text source 233. Both of these texts represent digital records stored in precise locations within computer memory as simple ".txt" or equivalent files.

For each syllable, word, group of words, or other chunk of meaning found within the study text source 222, there is a corresponding word or group of words within the teach text source 233, found in a precise horizontal alignment with respect to the study text source. These corresponding chunks of teach text source 233 represent translations of, and/or explanatory information to, each horizontally aligned chunk of study text source 222. Consequently, for each and every individual line or chunk of study text source 222, there is a corresponding line or chunk of teach text source 233, containing an equivalent chunk of associated explanatory information embodied in language which is likely to be understood by a student. Where there is an empty line 201 in the study text source 222, there is a corresponding empty line 201 in the teach text source 233. Also, where there are two empty lines 202 within the vertical arrangement of the study text source 222, there are two corresponding empty lines 202 within the teach text source 233.

Figure 7:
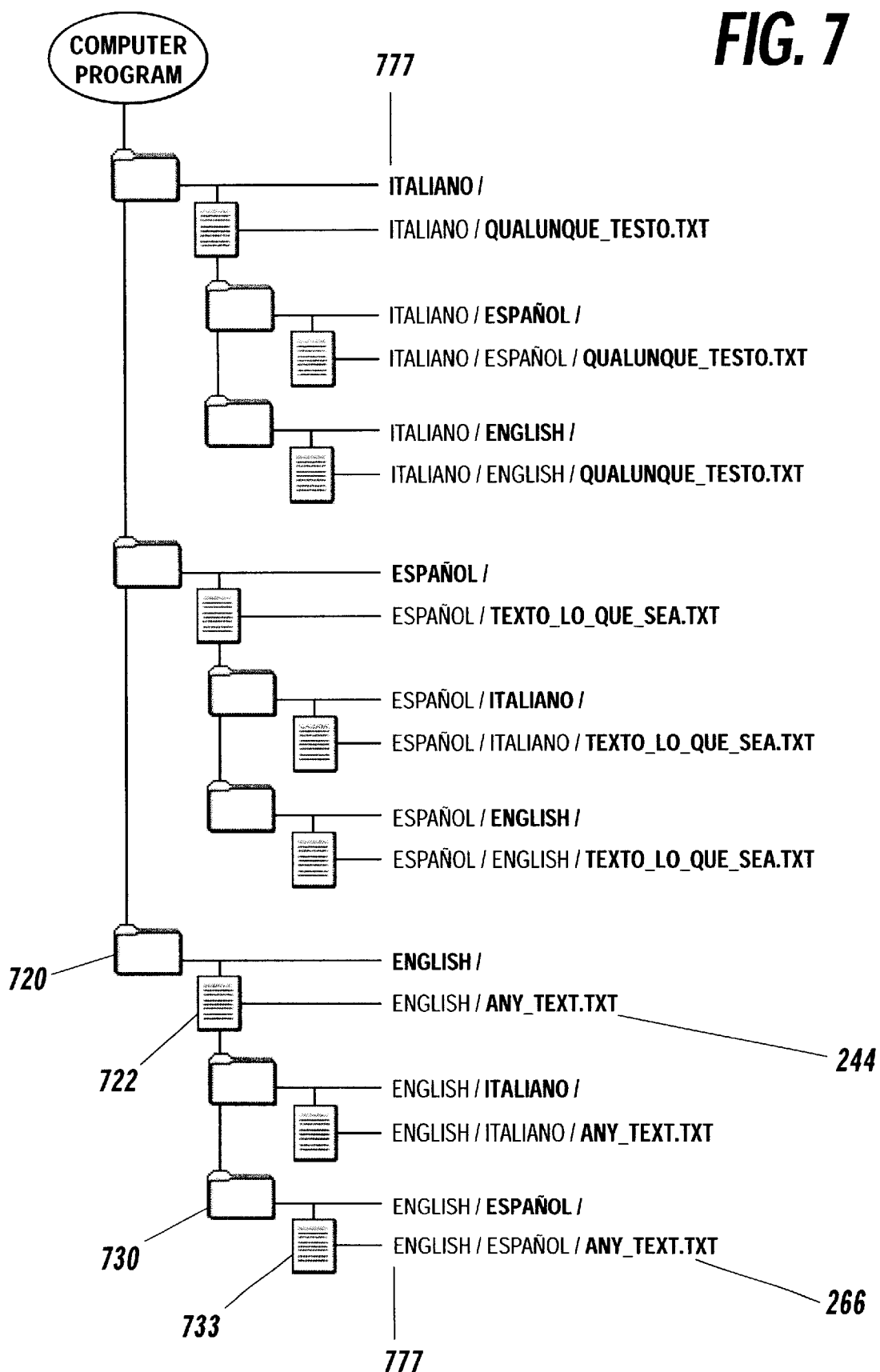
FIG. 7 shows a diagram of how the associated text source files shown in FIG. 2 are named and stored in computer memory along "paths" which identify folders and file names.

FIG. 7 represents a method by which these text source files, which contain specifically associated and textually represented chunks of meaning, can be archived in locations within computer memory, and thus accessible as data which allow software devices to format bitextual, bifocal presentations 333. FIG. 7 shows images which are commonly used to represent a hierarchical filing system typically employed to locate archives within computer memory, namely, "folders" or directories 720. These folders serve to locate both ".txt" or text files 722, as well as "subfolders" or subdirectories 730, which locate separate .txt files, such as a subdirectory text file 733. All folders, subfolders, and text files are identified by titles or names. Strung together, these names provide "paths" 777 to direct a computer user or program to a specific file.

Therefore, as seen in the diagram shown in FIG. 7, a main directory 720 contains a representative text file 722, as well as a representative subfolder 730, which, in turn, contains another representative subdirectory text file 733. The main directory 720 is titled "ENGLISH". As represented within the diagram of FIG. 7, the main directory 720 contains a text file 722, which is titled "ANY_TEXT.txt". This main directory 720 also contains a separate subfolder 730, titled "ESPAÑOL", which in turn has a separate subdirectory text file 733, which is also titled "ANY_TEXT.txt".

The "path" to a file is determined by the folder and subfolders which contain or locate the file. Consequently, as can be seen in the list of paths 777, the path to the text file 722 is identified as "ENGLISH/ANY_TEXT.txt", and the path to the subdirectory text file 733 is identified as "ENGLISH/ESPAÑOL/ANY_TEXT.txt". While the two text files 722 and 733 represented in FIG. 7 have the same name, they are located in different directories, or along different paths, and as such can contain different contents.

The text file 722 contains, for example, the text of the study text source 222 shown in FIG. 2, while the subdirectory text file 733 contains the text of the teach text source 233 shown in FIG. 2. Consequently, the paths to the text file 722 and to the study text source 222 are both identified as "ENGLISH/ANY_TEXT.txt". Additionally, the paths to both the subdirectory text file 733 and to the teach text source 233 are both identified as "ENGLISH/ESPAÑOL/ANY_TEXT.txt".

Figure 8:
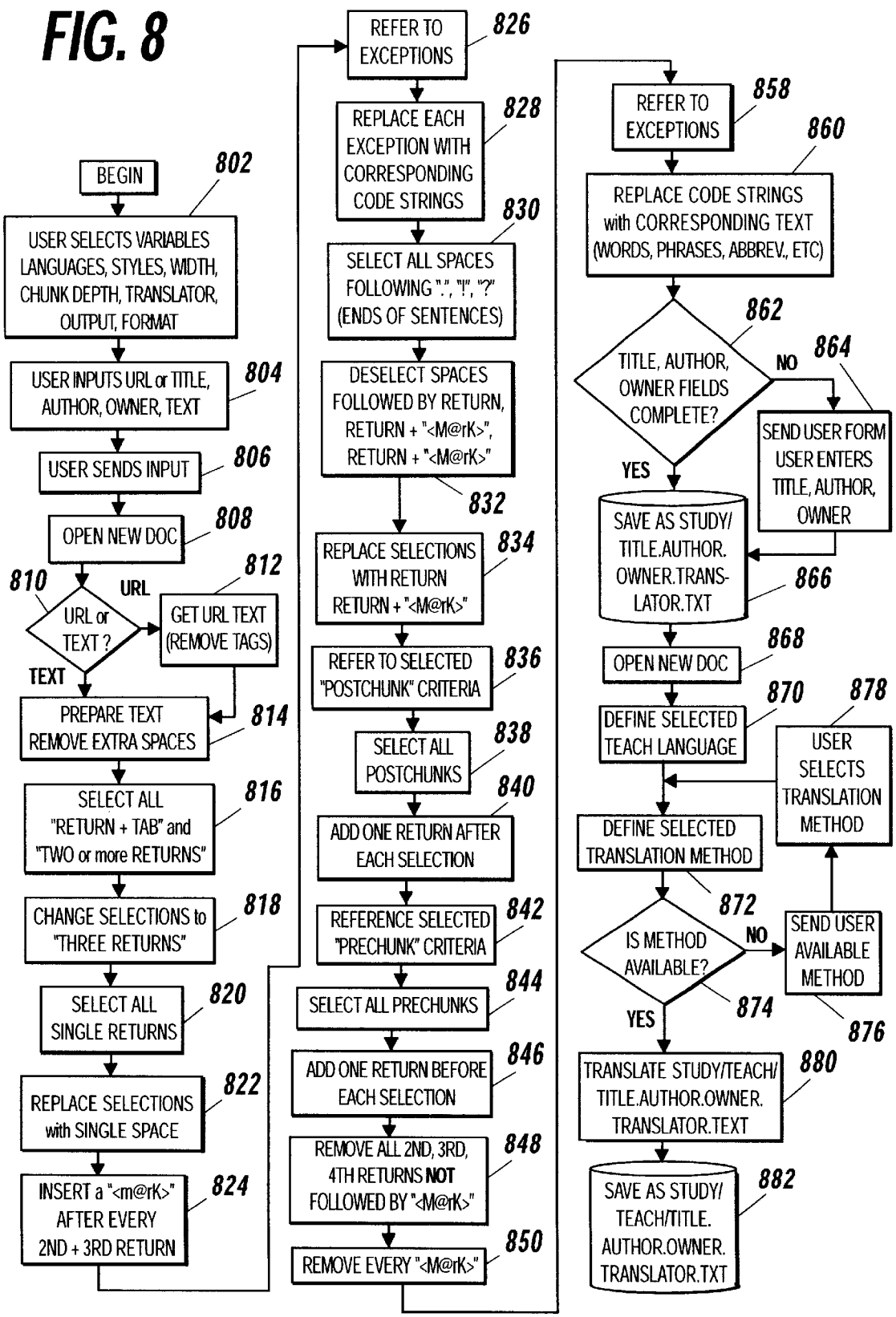
FIG. 8 shows a flow chart of a computer program which automatically separates a user selected study text into chunks, and then allows a selected machine translation device or human translator to create an associated teach text.

FIG. 8 shows a flow chart for a computer program that enables a user to automatically reorganize, or to "chunk," a selected text, thus transforming the selected text into a study text source 222; then to create an associated teach text source 233 by a selected method of translation; and then to store both sources. A complete description of the flow chart shown in FIG. 8 will be described later in connection with the operation of the preferred embodiment of the present invention.

Figure 9:
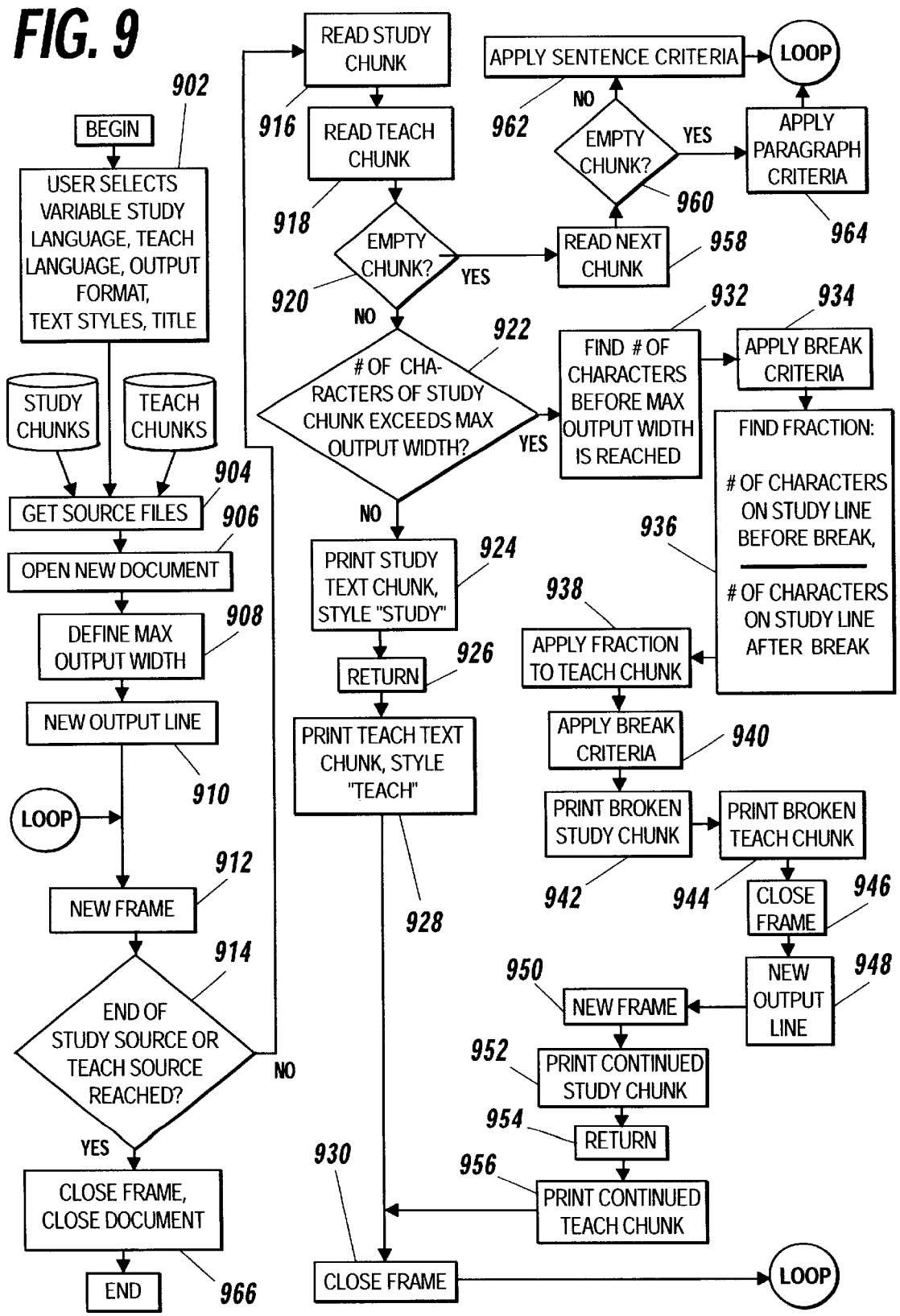
FIG. 9 is a flow chart of a computer program which accesses the two associated text files shown in FIG. 2 and then processes the two files to format a bitextual, bifocal presentation in accordance with the present invention.

FIG. 9 shows a flow chart which describes a computer program that obtains the textual information contained in both the selected study text source 222 and the teach text source 233; then reads each new line as an instruction to format a new frame, within which the associated chunks of study and teach text sources are formatted bitextually and preferably bifocally; while reading a single empty line 201 as an instruction to format a new sentence; and reading two empty lines 202 as an instruction to format a new paragraph. A complete description of the flow chart shown in FIG. 9 is also included below.

First, the general operation of the preferred embodiment in accordance with the present invention will now be described. The preferred embodiment formats a language being learned (that is, the study text 22) and the translation of that language in the native or known language used by the student (that is, the teach text 33) in a bitextual, bifocal presentation 333 to aid language learning.

Dual arrangements of a foreign text and an associated translation text are often used as educational devices aiming to teach proper use of a language to a student. The problem with conventional dual text presentations is that, while a student should focus on the foreign text, his or her eyes will likely stray to the translation text, and, consequently, the student habitually relies on that translation text, rather than effectively learning the foreign text.

Accordingly, the preferred embodiment of the present invention presents a translation or teach text 33 and a foreign or study text 22 upon separate focal planes, or provides a "bifocal" arrangement, and effects a bitextual, bifocal presentation 333. The teach text 33 is generally illegible, or not easily read, when viewed by a student from a comfortable reading distance of twelve to eighteen inches. The study text 22, by comparison, is easy to read at such a distance. Consequently, when the student is focused on the study text 22, and wants more information regarding a specific word or phrase, the student must shift his or her position to a relatively uncomfortable reading distance of six to nine inches, refocus his or her eyes on the tiny and faint teach text 33, gather the information, then again refocus on the study text, shift back to a comfortable reading distance, and resume reading the study text. Alternatively, the student can employ the use of a common magnifying glass to help discern the information provided by the teach text 33, although use of a magnifying glass should not be necessary for students with normal eyesight.

In accordance with one aspect of the present invention, the relative sizes of the study text 22 and the teach text 33 facilitate the learning process. That is, the relatively large size of the study text 22 causes the student to remain focused on the study text, unless the student intentionally refocuses on the teach text 33 for assistance in learning the study text.

The difference between the size of the study text 22 and the size of the teach text 33 performs several important functions to effect the objective of the present invention. The different sizes which distinguish the two texts 22 and 33 help to divide the bitextual, bifocal presentation 333 into separate focal planes, or bifocally, which hampers the student's ability to focus concurrently upon words in both the study text and words in the teach text.

The relatively small size of the teach text 33 has a less intrusive effect in relation to the relatively large size of the study text 22. Consequently, the student can better concentrate his or her attention on the more salient study text 22, with less distraction or interference from the information contained in the teach text 33.

In fact, the student can control the legibility of the teach text 33 simply by changing the distance between the teach text and his or her eyes. From a comfortable reading distance of twenty-four inches, for example, the teach text 33 should generally be illegible, while the study text 22 should generally be very easy to read.

The relatively small size of the teach text 33 requires the student to expend greater effort to discern the information carried within the teach text. Such inconvenience motivates the student to maintain focus on the study text 22, and encourages the student to remember any meaningful associations between related chunks of the study text and the corresponding teach text 33.

The relatively small size of the teach text 33 also enables the teach text to be located in proximity, and in a consistent juxtaposition in relation to the associated study text 22. For example, FIG. 3 shows the teach text 33 consistently positioned in central alignment with and directly below the associated chunk of study text 22. Consequently, the student can easily and dependably locate explanatory information contained in the teach text 33.

In relation to the larger study text 22, the relatively small size of the teach text 33 can, within equal limits of horizontal width, accommodate a significantly greater amount of textual information. This extra space allows a chunk of study text 22 to be more completely translated, defined, or explained by a chunk of teach text 33, within a presentation which typically does not force arbitrary gaps to appear in the horizontal spacing of the study text.

In accordance with the preferred embodiment of the present invention, relative differences in color density and/or color between the study text 22 and the teach text 33 also facilitate the learning process. Consequently, color density and/or color differentiation, especially when combined with the size difference described above, aid the learning of the study text 22 by the student and thereby enhance the learning process.

Preferably, as described earlier, the teach text 33 generally appears in a very light shade of gray or color, in a density, shade, or value of from 2% to 50% of the density or darkness of the study text 22. The difference in the shades or colors of the study text 22 and the teach text 33 in accordance with the preferred embodiment of the present invention serves two important functions.

The light shade and/or color of the teach text 33 have a less intrusive effect in relation to the dark shade and/or color of the study text 22. Consequently, the student can more easily focus his or her attention on the more salient study text 22, with less distraction caused by the information contained in the teach text 33.

Also, the light shade and/or color of the teach text 33 require the student to expend a relatively greater effort to discern the information carried within the teach text 33. Consequently, the student is encouraged to maintain focus on and learn the study text 22.

When the medium for presentation is ink on white paper, and when the teach text 33 appears in a light-colored "non-photo" shade of blue, the non-photographically reproducible characteristic of this light color is also very difficult for typical photocopy machines to detect, and thereby reproduce. Also, photocopy machines have difficulty detecting other colors, such as light yellow. Consequently, potential piracy of at least the teach text 33 which comprises the bitextual, bifocal presentation 333 also can be effectively frustrated.

While "non-photo" blue is preferred for the teach text 33 within the bitextual, bifocal presentation 333 in accordance with the preferred embodiment of the present invention for formatting the teach text with the study text 22, persons skilled in the art will understand, as stated previously, that many color combinations can serve to effect the bifocal presentation of associated texts. Consequently, the method of the present invention, when accessed via a computer network, preferably permits a user to format the study text 22 and the teach text 33 in a color presentation using different shades of color or colors of his or her choice.

The preferred embodiment of the present invention also provides a consistent juxtaposition between the study text 22 and the teach text 33. Preferably, the teach text 33 is juxtaposed below the study text 22 in the case in which the language being learned is horizontally oriented. Alternatively, although less preferred, the teach text 33 may be juxtaposed above the study text 22 in the case in which the language being learned is horizontally oriented.

FIG. 4 shows the manner in which the relatively small teach text 33 is graphically associated with the relatively large study text 22, in a constant and consistent pattern. Preferably, by precisely centering each chunk of smaller teach text 33 below the associated chunk of larger study text 22, the student can dependably locate explanatory information in the teach text in a consistent spatial juxtaposition in relation to the study text.

The techniques of the prior art in most cases fail to consistently present chunks of translation text in a precise central alignment with respect to the text of the language being learned. Central alignment of the related "chunks of meaning" reinforces the student's intuitive association between the individually related chunks of study text 22 and teach text 33.

When, as shown in FIG. 4, an individual chunk of study text 22 is interrupted by a line break 423, as forced by a limited width of a given medium of presentation, such as the width of a page on which the bitextual, bifocal presentation 333 is printed, the associated chunk of teach text 33 is also interrupted, and divided proportionally, so that if the line break 423 and its continuation on a subsequent line 424 were to be reassembled on a single line, the reassembled chunk of teach text would be centered directly under the associated recombined chunk of study text. Therefore, a chunk of teach text 33, when interrupted by a line break 423, is aligned to the right edge of its associated and interrupted chunk of study text 22, and then when continued in the subsequent line 424, the teach text is aligned to the left edge of the continuation of the interrupted chunk of study text.

No known prior art dual text presentation provides a systematic technique to associate a chunk of meaning when interrupted by a line break. The consistent pattern provided by the preferred embodiment of the present invention serves to signal the student that an interrupted chunk of meaning is continued on the next line. Consequently, the right- and left-justified portions of the associated teach text 33 distinguish the integral chunk of meaning from two distinct and completely separate chunks of associated study text 22 and teach text 33, which happen to occur on separate lines.

In summary, the preferred embodiment of the present invention provides a bifocal display effected by the graphic relationship between the study text 22 and the teach text 33, preferably including distinct sizes and color densities and/or colors of the characters for the respective study text and the teach text and a consistent juxtaposition between the texts, as described above. The format of the bitextual, bifocal presentation 333 in accordance with the present invention facilitates learning of the study text 22.

While the illustration in FIG. 4 comprises two Latin alphabets, both written horizontally and from left to right, the bitextual, bifocal presentation 333 can also be used for an Arabic script, which proceeds from right to left, or an Asian script, which may be typically presented vertically, and thus other formats are contemplated. The objective, in any of many of the possible combinations, is that the study text 22 appears in a highly visible fashion, while the teach text 33 appears smaller and more faintly in relation to the study text, and in a consistent juxtaposition in relation to the chunks of the study text, and thereby effects a bifocal presentation. Thus, the student can effectively focus on the study text 22 to be learned, while referring to the unobtrusive explanatory teach text 33 only when necessary.

In accordance with a further aspect of the present invention, an authoring interface to create bitextual, bifocal presentations 333 is also provided. A preferred method to produce the bitextual, bifocal presentations 333 will now be described in detail.

Dual text presentations are most practically created by using modem tools, such as computers running word processing programs. In order to create practical examples of bitextual, bifocal presentations 333 using a computer, a typical word processing or page-layout program typically requires a time-consuming series of repetitive steps, often yielding imprecise results. No known prior art discloses a technique to automate and facilitate this painstaking process. One embodiment of the present invention allows an educator or translator to easily associate specific chunks of study text 22 with corresponding chunks of teach text 33 and store these associated texts in the memory of a computer, thereby allowing computer programs to locate and then automatically process these associations into effective bitextual presentations and, preferably, into bitextual, bifocal presentations 333.

In accordance with a preferred embodiment of the present invention, a method is provided to associate a study text 22 with a teach text 33. The method of the present invention starts with any text file. In order to create a bitextual, bifocal presentation 333, for example, a user must first prepare and store a study text source 222 in association with a teach text source 233, as described above. As stated previously, the authoring interface that is provided enables a user to automatically create these source files. Alternatively, the user can manually create these files, and input them into computer memory.

Referring again to FIG. 1, a text file 111 is shown, which represents any text of any length, written in any language capable of being stored in computer memory as a common ".txt" or "Unicode equivalent" file, for example. (Unicode is a consortium which is enabling all of the world's alphabets to be stored in computer memory and exchanged across computer networks.) Note that the representative text file 111 contains words or groups of words, which are organized into sentences, which are then grouped into paragraphs, or their closest equivalents.

Next, the method in accordance with the present invention separates the language into chunks, sentences, and paragraphs. As shown in FIG. 2, the text file 111 has been modified into a more vertical format, simply by identifying individual units of thought, represented as words, groups of words, or "chunks of meaning," next inserting the cursor after the identified chunk, and then using the "enter" or "return" key on the computer's keyboard to effect new line breaks, and thus effect the vertical format represented in FIG. 2. This process transforms the text file 111 shown in FIG. 1 into the study text source 222, as shown in FIG. 2.

As described earlier in connection with FIG. 2, each new chunk of study text source 222 is stored in computer memory after a line break 423. A new sentence is stored in computer memory after two line breaks 423, or below one empty line 201. The beginning of a new paragraph is stored in computer memory after three line breaks 423, or below two empty lines 202.

Separating a text into chunks, sentences, and paragraphs can be accomplished manually or, alternatively, with the aid of a computer program for which a flow chart is shown in FIG. 8, as will be described in more detail below. The text can be "chunked" according to variable criteria.

Once the study text source 222, as shown in FIG. 2, has been "chunked," or separated into chunks of meaning, sentences, and paragraphs, or their equivalents, then an associated teach text source 233 can be created. Then, the method of the present invention associates the chunks of study text 22 to be learned with chunks of teach text 33.

As shown in FIG. 2, for every chunk of study text source 222, there is a corresponding chunk of explanatory information provided by the teach text source 233. The teach text source 233 corresponds precisely to the study text source 222. That is, for each new line or chunk of study text source 222, there is a horizontally aligned chunk of teach text source 233. Also, for each new sentence identified by one blank line 201 within the study text source 222, there is a corresponding blank line within the teach text source 233. Additionally, for each new paragraph identified by two blank lines 202 within the study text source 222, there are two corresponding blank lines within the teach text source 233.

Consequently, exact associations between specific chunks of study text source 222 and teach text source 233 are created, and now need to be stored in computer memory, so that computer programs can locate these associations, and format them into effective bitextual presentations to help people to learn languages. Accordingly, the method in accordance with the present invention preferably archives the associated texts in computer memory. Both of the representative text files shown in FIG. 2 have locations, or "paths," which identify where, in the memory of a computer, the individual texts are stored, and thus allow the texts to be located and retrieved upon demand by a computer program or a human user.

Preferably, a text, such as the sample text 111 shown in FIG. 1, is stored within computer memory as a "text" or ".txt" file, and identified by the title 141. Such text files are typically stored in a directory, or folder, which is also identified by a title. A directory can contain a group of text files and can also contain subdirectories or subfolders, which can, in turn, contain additional text files. By combining the titles of the directories, subdirectories, and text files which they contain, a computer can identify the exact location of, or "path" to, a specific archive stored in computer memory.

Typically, titles for directories are followed by a slash, either a backward slash, "\", or a forward slash, "/", while titles for files or archives are followed by an extension, such as ".txt", which identifies which type of file is stored within the directory. For example, as shown in FIG. 7, a path 244 to the study text source 222 is identified as "ENGLISH/ANY_TEXT.txt". Thus, within a directory titled "ENGLISH", a text file titled "ANY_TEXT.txt" is located.

Meanwhile, a path 266 to the teach text source 233 includes a subdirectory titled "ESPAÑOL", which is located within the main directory titled "ENGLISH". Consequently, the resulting location of the representative teach text source 233 is addressed by a unique path "ENGLISH/ESPAÑOL/ANY_TEXT.txt".

Note that while the representative file names for both the study text source 222 and the teach text source 233 have exactly the same title, namely, "ANY_TEXT.txt", each is located in a distinct directory, and found by a different path, and thus can contain different information, with no conflict arising in the computer. Also, since the associated study text source 222 and teach text source 233 have exactly the same file name, a computer program can easily locate and associate them, and then format a bitextual display, according to the languages and preferences selected by an individual user.

Thus, the main directories which contain study text sources 222 are preferably titled by the name of the language to be learned. Within each of these main directories, subdirectories which contain associated teach text sources 233 are titled by the name of the language which is already understood by the student.

For example, if a student speaks English, and wants to learn Spanish, his or her study text sources 222 are located in a main directory named "ESPAÑOL", or SPANISH. Within this main directory is a subdirectory named "ENGLISH", which contains teach text sources 233 that are associated with study text sources 222 found in the main directory called "ESPAÑOL".

Alternatively, main folders can be addressed and accessible on the Internet as "subdomains." For example, a website located at AOL.COM could offer a sub-website located at "ENGLISH.AOL.COM", where people of a variety of languages could study English. The sub-website could then provide associated translation texts at locations such as "ENGLISH.AOL.COM/ESPAÑOL" or "ENGLISH.AOL.COM/FRANCAIS". In addition, bifocal, bitextual presentations 333 may be accessed on the Internet via an alternative protocol, similar to IRC, LYNX, or HTTP. Such a protocol, named "ABZ", for example, enables bitextual, bifocal presentations 333 to be distributed from Internet URL's such as "ABZ://ESP.ENG.CHAORDIC.ORG", where "CHAORDIC.ORG" represents an Internet website, "ENG" represents a "server" containing an English language directory of study texts 22, and "ESP" represents a "sub-server" containing a Spanish language subdirectory of teach texts 33 associated with the study texts in accordance with the present invention. Thus, any language capable of being written and recorded in digital memory in text files, directories, and subdirectories or their equivalents can interact with any similarly capable language, and be presented in accordance with the present invention as a bitextual presentation, preferably the bitextual, bifocal presentation 333.

It should be noted that the paths and file names found in FIG. 2 and in FIG. 7 are examples. Actual file names which allow computer programs to locate specific text sources and then to format bitextual, bifocal presentations 333 can include much more information, such as the title, author, and copyright owner of a study text 22, as well as the translator or creator of an associated teach text 33 to enable attribution to a particular author or translator.

Such information, contained in the title, helps to track and to organize the wide variety of possible interpretations of a single foreign source text for bitextual presentation. As such, individual educators or translators of various languages can produce individual interpretations of how a text can be chunked, and they can provide individual interpretations of what teach text 33 should be associated with a chunked study text 22.

If a single text can be produced from any one of many hundreds of human languages and if a single language can produce an unlimited number of texts and if any one of these texts can be translated to any of many hundreds of other languages, and if, within any specific pair of languages, different translators can produce alternative interpretations of how to chunk, associate, and interpret texts to effect a bitextual presentation; and if two separate text files must be associated in order to allow computer programs to access these associations; then, an effective method to name these associated text files and then to store them in locations in computer memory is needed. Accordingly, the preferred embodiment of present invention provides a method in which these associated text files preferably have exactly the same name, but are stored in separate folders, which identify the languages of the study text 22 to be learned, and the teach text 33 already known.

Figure 10:
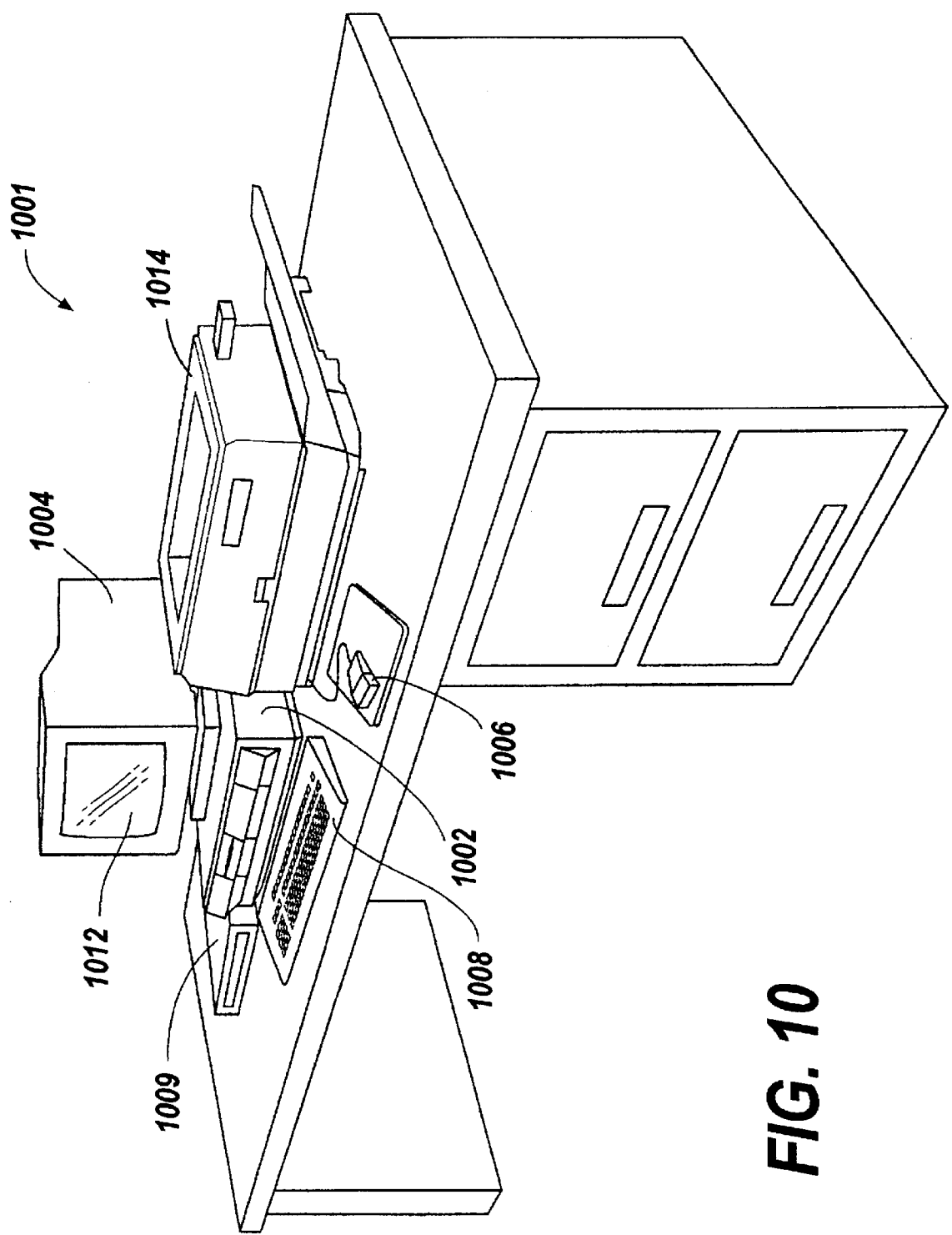
FIG. 10 shows a computer system for accessing the computer program shown in the flow charts of FIG. 8 and FIG. 9.

An implementation of a computer system currently used to access the computer program in accordance with one embodiment of the present invention is generally indicated by the numeral 1001 shown in FIG. 10. The computer system 1001 typically comprises computer software executed on a computer 1002, as shown in FIG. 10. The computer system 1001 in accordance with one exemplary implementation is typically a 32-bit application compatible with a GNU/Linux operating system available from a variety of sources on the Internet, or compatible with a Microsoft Windows 95 or later operating system available from Microsoft, Inc. located in Redmond, Wash. or an Apple MacIntosh operating system available from Apple Computer, Inc. located in Cupertino, Calif. The computer 1002 typically comprises a minimum of 16 MB of random access memory (RAM) and preferably includes 24 MB of RAM. The computer 1002 also comprises a hard disk drive having 40 MB of free storage space available. The computer 1002 is also preferably provided with an Internet connection, such as a modem or network card, for connection to web sites of other entities.

Means for displaying information typically in the form of a monitor 1004 connected to the computer 1002 is also provided. The monitor 1004 can be a 640×480, 8-bit (256 colors) VGA monitor and is preferably an 800×600, 24-bit (16 million colors) SVGA monitor. The computer 1002 is also preferably connected to a CD-ROM drive 1009. As shown in FIG. 10, a mouse 1006 is provided for mouse-driven navigation between screens or windows. The mouse 1006 also enables students or translators to review a bitextual presentation and print the presentation using a printer 1014 onto paper or directly onto an article.

The preferred embodiment of the present invention provides a computer program running at a website for creating and providing access to provide bitextual presentations. The computer program is preferably accessible through an Internet interface, using an HTTP or other Internet protocol. Other versions of the computer program can be, in accordance with the present invention, implemented to run directly upon a single computer system such as that shown in FIG. 10, workstation computers capable of formatting books and magazines which can be printed on paper and distributed for retail sale, or emerging computer devices, such as electronic book devices and information kiosks, and other devices, as they become available. Such versions of the computer program may be installed from a compact disc in the CD-ROM drive 1009 but are preferably downloaded directly from the Internet. The computer program implements the method in accordance with the present invention, which will now be described in conjunction with the flow charts which appear in FIG. 8 and FIG. 9.

A preferred embodiment of a computer program for automatically processing a digitally stored text by separating the text into chunks, translating the chunks, and then storing the associations in specific locations in computer memory appears in the flow chart shown in FIG. 8. A network interface enables a user to search for, select, and view existing or previously created examples of bitextual presentations, or to create new ones with machine translation and/or human translation. Additionally, a user can reinterpret or create an alternative translation to that of another user or of a machine translation device.

In order to employ the network interface, preferably, at least two computers are interconnected, one "server," which runs software capable of sending, delivering, or distributing requested digital information, and another "client," which runs software capable of accessing, requesting, and retrieving digital information from the server computer. The client and server programs exchange information between each other according to a network protocol, such as the TCP/IP protocol, and then according to a user interface protocol, such as the HTTP protocol. Preferably, the computer program described below exchanges digital information between computers by such protocols.

Once connected to the computer network, a user can access a specific location, Universal Resource Locator, or URL, which contains the computer program, and access a provided graphical interface which allows various bitextual presentations to be easily searched for, viewed, created, and/or stored. In order to gain access to such a location, a user must first agree to the terms and conditions of use. Then, the user can create a unique user name, which when authenticated by a password or a biometric verification process, correctly identifies the unique user and allows her or him to produce bitextual presentations, such as the bitextual, bifocal presentations 333 in accordance with the present invention. Identifying a specific user with a specific user name enables the computer program to track his or her individual creation and usage of bitextual presentations.

There are certain variables that are associated with the production of bitextual presentations, such as the preferred bitextual, bifocal presentations 333 in accordance with the present invention. The variables will now be described in detail.

Before searching for, viewing, or creating a bitextual presentation when connected to the network interface, a user must first make specific selections among a variety of variables. For example, an individual user selects overall preferences, which can include the desired width of presentation; the desired presentation styles for the study text 22 in relation to the teach text 33; a limitation of languages and/or language translation resources offered to the individual user; and the chunk depth. Then, the user selects among variables to define a specific example of bitextual presentation. Such variables include the language of the study text 22; the language of the teach text 33; the desired bitextual presentation output, such as the bitextual, bifocal presentation 333; the computer language to deliver the presentation; the medium of display; and other variables, as needed, as indicated by a step 802 shown in FIG. 8.

Considered in more detail, selection of a specific study text language directs the computer program to a specific study language folder. Selection of a specific teach text language directs the computer program to a specific teach language subfolder contained within the study language folder, as shown in FIG. 7.

Variable output presentations are available to the user. Some outputs adapt the bitextual presentation to poetry or lyrics. Others offer vertical presentations, which may be more suitable for beginners, or students of non-Western languages. Additional formats can be tailored for specific uses, such as Internet web pages.

A variety of computer languages can deliver the bitextual presentations. Typically, a user connected to the Internet will by default select a Hyper Text Mark-up Language or "HTML" version for the bitextual presentation. Alternate versions provide for "plain text" presentations that can be easily exchanged as electronic mail, or "e-mail." Portable Digital Format, or "PDF," PostScript, and other computer language deliveries can enable precise outputs to be printed as ink on paper versions. Additional outputs, such as eXtensible Mark-up Language, or "XML," and other formats for delivery and display of bitextual presentations, can be provided by the computer program.

It should be noted that different users will have different preferences regarding the appearance of the study text 22 and the teach text 33 in general, and the teach text in particular. For example, a beginner or user with poor eyesight may prefer a more visible presentation of the teach text 33, while an advanced student or user with excellent eyesight may prefer a less visible, or more bifocal, presentation of the teach text. Thus, the computer program allows an individual user to customize the appearance of the teach text 33, thus enabling a user to select a bitextual presentation, particularly a bitextual, bifocal presentation 333, according to his or her individual need and preference.

In particular, the preferred embodiment of the present invention enables the creation of a bitextual, bifocal presentation 333. A user who desires to automatically create such a presentation must select among additional variables, including a specific criterion for separating the individual units of thought, or the "chunk depth," and a technique for translation, whether by a human, or by a specific machine translation device.

The chunk depth refers to the frequency of chunks. For example, if a user desires word-for-word translations, then, in general, a "return" is added after each space between words, thereby identifying each individual word as a chunk of meaning. A user selecting "deep chunks" instructs the computer program to add returns within a sentence only after punctuation, such as after commas, colons, and semi-colons. "Simple chunks" provide an intermediate level of chunking. "Lyric chunks" offer a chunk approach tailored for songs or poems. Custom chunk depths can be added to the computer program and interface.

A variety of machine translation or "MT" devices, available both commercially and in educational networks, can be connected to the computer program. Thus, the computer program provides for a user to select a specific MT device to assist in the creation of an associated teach text source 233. In addition, a user can use the interface to request a human translation of a selected text. Qualified human translators can create such translations, and correct and amend other interpretations as needed, when using the interface.

Now that the user has selected his or her preferences and variables, he or she can proceed to create the source files necessary to create a bitextual presentation, such as the bitextual, bifocal presentation 333 in accordance with the present invention. As indicated by a step 804 shown in FIG. 8, the user selects a title and other information.

Considered in more detail, a common title must be created for both the study text source 222 and the teach text source 233. Separate text input windows are provided for the title of the text, the original author of the text, and its owner or copyright holder. If the user selects an available MT or machine translation device to create the text translation, then that device is credited as the translator of the document in the above-mentioned file naming system. If the user is a qualified translator and chooses to create the translation manually, then he or she is identified as the translator. The user is "logged-in" when using the interface and can therefore be identified.

Along with this data needed to create a title for the source files, the user must send a text to be processed by the computer program, as indicated by the step 804 shown in FIG. 8. A separate window is preferably provided by the interface, along with instructions to insert the desired text within this window. When the data fields are complete, the user then sends the data to the computer program, as indicated by a step 806 shown in FIG. 8. When the computer program receives these various title and text data, it combines them into fields separated by periods, which are combined to create the file name, such as "Title.Author.Owner.Translator.txt", as indicated by a step 808 shown in FIG. 8. This title identifies the text which the user intends to process into a bitextual presentation.

Alternatively, a user can simply input and send the address of a URL, as indicated by the step 804 shown in FIG. 8, which instructs the computer program to access the text within a specific web page. The computer program determines whether the user has sent text or text has been accessed at a web page, as indicated by a step 810 shown in FIG. 8. If the text is accessed at a web page, the computer program removes irrelevant elements, as indicated by a step 812 shown in FIG. 8, and process the extracted text, as described below. Such texts can be processed into a bitextual presentation, but to save them, the computer program preferably prompts for the required author and owner information. The URL is used as the title.

The computer program preferably accommodates a chain of interpretation, which credits multiple translators of a document. For example, if a user named "JDoe" uses a MT translation called "gr8" to translate a study text source 222, the resulting filename "title.author.owner.gr8.txt" is assigned.

Users can easily make corrections to translations. If, for example, JDoe corrects the gr8 translation, the resulting filename is modified to "title.author.owner.JDoe+gr8.txt". Then, if another user named "JaneS" reviews the corrected translation, and chooses to enter further corrections, the resulting filename for the interpretation by JaneS becomes "title.author.owner.JaneS+JDoe+gr8.txt".

Consequently, in this example, three different interpretations of one title become available to users. Alternatively, JaneS may choose to create a manual translation, derived independently of JDoe or gr8, which, in the current example would result in a file named "title.author.owner.JaneS.txt". The computer program preferably limits individual translators to a single interpretation of a text. For example, JaneS cannot store both "title.author.owner.JaneS+JDoe+gr8.txt" and "title.author.owner.JaneS.txt" concurrently.

Now that the computer program has determined how source text files are to be titled, the computer program can process the text with either automatic or manual chunking and translation, and then automatically produce the bitextual presentation. First, the source text must be prepared, as indicated by a step 814 shown in FIG. 8. If the user sends a URL, the computer program obtains the text contained at the URL, opens a new document, copies the text into the document, and removes irrelevant format elements, such as repeated spaces after line breaks. If the user sends a text directly, the computer program opens a new document, copies the text into the new document, and removes irrelevant format elements, such as repeated spaces after line breaks.

The computer program then identifies the paragraphs, as indicated by a step 816 shown in FIG. 8. Paragraphs within a text are typically located after one line break followed by a tab. Alternatively, paragraphs are located after one empty line, or after two line breaks. With HTML coding, paragraphs are identified by the tag "<p>". Other paragraph identifiers can be added to such paragraph criteria.

The computer program refers to such criteria, finding all instances of paragraphs within a text, and then preferably replaces those criteria with three returns, as indicated by a step 818 shown in FIG. 8. It should be noted that a computer program can read a line of text of unlimited width, while humans typically read text from media of limited horizontal width, and thus employ "line breaks" or "returns" to access an entire text. Consequently, within a single line of text, "returns" can be inserted to instruct the computer program to format, display, or print upon multiple lines, and thus to be legible to a user.

Next, the computer program locates all single returns, or returns which are not in groups of three returns, as indicated by a step 820 shown in FIG. 8, and then converts them to single spaces, as indicated by a step 822 shown in FIG. 8. Before any new returns can be inserted to identify chunks and sentences, the computer program preferably inserts a mark after the second and third returns of three-return strings, as indicated by a step 824 shown in FIG. 8. These marks protect the structure of the paragraphs in case any accidental triple returns are created by the ensuing steps.

In order to format sentences and chunks, the computer program refers to specific criteria which the computer program applies to insert returns before and/or after certain strings of text. For example, the computer program typically adds two returns after every period followed by a space, or "." text string. But since periods also identify abbreviations such as "St." or "Mrs.", the computer program must first identify such exceptions, before applying the general rule. The computer program handles the exceptions as follows.

Before formatting individual sentences and chunks, the computer program first refers to a modifiable list of exceptions to the criteria by which such sentences and chunks are identified, as indicated by a step 826 shown in FIG. 8. Each exception has a corresponding identifier, such as "<x1>" or "<x2>", as indicated by a step 828 shown in FIG. 8. For example, if the exceptions include an abbreviation, such as "St.", and this exception corresponds to the identifier "<x3>", then the computer program searches the entire text for the text string "St.", temporarily replacing all such strings with "<x3>". Thus, in accordance with the method of the present invention, during the process of automatically chunking a text, every individual example found within an exceptions file is searched for, and when found, is replaced with its corresponding identifier, thus protecting the exception from the subsequent application of rules for inserting returns after sentences and chunks.

The method in accordance with the present invention then identifies sentences and chunks. The computer program returns to the beginning of the text and looks for elements of punctuation that identify the end of a sentence, including, in the English language, such punctuation as periods, exclamation points, question marks, and others, each followed by at least one space, as indicated by a step 830 shown in FIG. 8. Any space selected which is followed by a triple return, for example, is then deselected, as indicated by a step 832 shown in FIG. 8. Next, all selected spaces are replaced with two returns, the second return being followed by the previously used mark, thus protecting the sentence structure from accidental double returns which may be created in adding returns before and/or after specific chunk text strings, as indicated by a step 834 shown in FIG. 8. Again, it should be noted that that while two returns are inserted after a sentence, the computer program continues to read the entire text as one line, but presents each new sentence to the human reader after two returns, in accordance with the method of the present invention.

Once sentences have been identified, the computer program proceeds to identify likely chunks of meaning within the sentences. To do so, the computer program refers to the user selected chunk depth, which, as described above, allows a user to choose the frequency of new chunks. Typically, this frequency is defined by three criteria, namely, certain sequences of characters or text strings before which a single return is added, text strings after which a single return is added, and previously discussed exceptions to these rules.

Text strings before which a single return is added are included in "prechunk" criteria. Text strings after which a single return is added are included in "postchunk" criteria. A single text string can be included in both the prechunk and postchunk criteria.

Proceeding to identify likely chunks according to a selected chunk depth, the computer program returns to the beginning of the line and refers to postchunk criteria, as indicated by a step 836 shown in FIG. 8, which identify specific text strings after which the computer program must add a single return, as indicated by a step 838 shown in FIG. 8, thereby ending a chunk of meaning. In the English language, punctuation marks, such as commas, colons, semicolons, and a closing parenthesis or bracket, can typically identify the end of a chunk, as can commonly used words such as "and," "or," "with," and "that." In the case of punctuation marks, the text string typically includes an empty space after the mark, while with words, the text string includes the empty space before the word and the empty space after the word. Such punctuation marks and text strings can be included within postchunk criteria of a selected chunk depth. Thus, the computer program refers to a modifiable list of postchunk criteria, as indicated by the step 836 shown in FIG. 8, selects all text strings which meet the postchunk criteria, as indicated by the step 838 shown in FIG. 8, and adds a single return after each example that is found, as indicated by a step 840 shown in FIG. 8.

Once the computer program has applied the postchunk criteria, the computer program returns to reread the line and add new returns according to prechunk criteria, as indicated by a step 842 shown in FIG. 8. To do so, the computer program refers to the prechunk criteria to identify the text strings before which a return should be inserted. Such text strings in the English language may typically include common words, such as "and," "or," "with," "that," and "to;" common verbs, such as "do" and "have;" various conjugations of verbs, such as "done," "had," "will," and "would;" and other words, such as "when," "why," "how," "where," "who," and "what." A variety of these and other words can be included within a modifiable list of prechunk criteria.

As with the postchunks, these prechunk text strings include the space before and the space after the identified words. Thus, the computer program inserts a return before the word "to," but not the word "toe." Punctuation, such as an opening parenthesis or opening bracket can also be included in the prechunk criteria. Thus, the computer program refers to a modifiable list of prechunk criteria, as indicated by the step 842 shown in FIG. 8, selects all text strings which meet the prechunk criteria, as indicated by the step 844 shown in FIG. 8, and adds a single return before each example that is found, as indicated by a step 846 shown in FIG. 8.

Now the computer program has identified all paragraphs, sentences, and individual chunks, and has inserted returns between them in accordance with the method of the present invention. Any accidental double, triple, or quadruple returns are eliminated by finding all second, third, and forth returns that are not followed by the previously inserted mark and then removing those unmarked returns, as indicated by a step 848 shown in FIG. 8. Then, the marks are removed, as indicated by a step 850 shown in FIG. 8, leaving the text formatted with single, double, and triple returns.

After the rules for chunking the text have been applied, the computer program returns to replace all of the previously inserted coded exceptions, such as <"x3">, with their corresponding original text strings. The computer program selects all of the previously marked exceptions, as indicated by a step 858 shown in FIG. 8, and substitutes the actual text string, such as "St.", for the mark, as indicated by a step 860 shown in FIG. 8. Thus, the text retains its original sequence of words, but is reformatted by the method of the present invention. While the computer program reads just one line of text with precisely inserted returns, it displays the text to the human reader with one return after each new chunk, two returns after each new sentence, and three returns after each new paragraph.

As indicated by a step 862 shown in FIG. 8, the computer program checks to assure that the user has provided the information requested at the step 804 shown in FIG. 8, and if not, requests the user to provide that information, as indicated by a step 864 shown in FIG. 8. The computer program then saves the file within the study text source directory selected by the user, as indicated by a step 866 shown in FIG. 8. If the user selected an English language text for the study text source 222, then the resulting path to this specific file would be "ENGLISH/title.author.owner.translator.txt", as described above.

The computer program then must translate the chunked study text source 222. That is, after the computer program has processed a chunked study text source 222 and saved the study text source in the prescribed location, the computer program must next help a user to produce a teach text source 233 and to save the teach text source in a prescribed location.

Thus, the computer program opens a new document, whose title exactly matches the previously generated study text source document, as indicated by a step 868 shown in FIG. 8. Then, the computer program defines which language the user selected for the teach text source 233, as indicated by a step 870 shown in FIG. 8, which instructs the computer program in which subfolder, or along which path, the new document will be stored.

Now the computer program defines which MT or machine translation device the user selected, as indicated by a step 872 shown in FIG. 8. Since not all MT devices are able to translate between all languages, the computer program queries whether the selected MT device is available, as indicated by a step 874 shown in FIG. 8.

If translation from a study text language to a teach text language is unavailable from the selected MT device, then the computer program presents the user with a list of available machine translators, as indicated by a step 876 shown in FIG. 8. If no MT device is available, then the computer program sends the user an interface which allows the user to either manually input a translation, or to request another human to create a translation of the chunked study text source 222, as indicated by a step 878 shown in FIG. 8. A more detailed description of this manual translation and reinterpretation interface will be provided below.

If translation from the selected study text language to the selected teach text language is indeed available, as indicated by the step 874 shown in FIG. 8, then the computer program sends the chunked study text source 222 to be processed or translated to the selected teach language by the selected MT device, as indicated by a step 880 shown in FIG. 8. When the computer program receives the resulting translated text from the MT device, the computer program stores this text within the open document, and then stores the document, with the proper title and in the proper subdirectory, as indicated by a step 882 shown in FIG. 8.

Thus, as shown in the flow chart in FIG. 8, the computer program helps a user to automate the process of separating a text into the chunked study text source 222; to generate a teach text source 233 in association with the chunked study text source; and to store the associated files in accordance with the method of the present invention. Now the files are ready to be automatically processed into a bitextual, preferably bifocal, presentation format.

The method in accordance with the present invention also provides a bitextual presentation, such as the bitextual, bifocal presentation 333, using a computer program. Once the study text source 222 and the teach text source 233 have been associated and stored in accessible locations in computer memory, then a variety of computer programs can access and format these associations into any of many possible bitextual presentations. FIG. 9 is a flow chart of a computer program which automates the formatting of one such bitextual presentation, specifically adapted to text composed of sentences and paragraphs, and displayed on a medium of limited width.

If a user has automatically processed the necessary study text source 222 and teach text source 233, as described in connection with FIG. 8, then the computer program automatically processes the texts according to the display or presentation selected by the user, as indicated by a step 902 shown in FIG. 9. That is, if the user has selected a bitextual presentation composed of paragraphs and sentences, as opposed to a presentation of poetry or lyrics, then the computer program formats the source texts by the process shown in FIG. 9.

As shown in FIG. 9, the computer program obtains the specific text source files for both the study text 22 and the teach text 33, as indicated by a step 904 shown in FIG. 9, and opens a new document, as indicated by a step 906 shown in FIG. 9. The new document is configured to the user selected preferences. The computer program defines the maximum output width for the medium on which the study text 22 and the teach text 33 are to be presented, as indicated by a step 908 shown in FIG. 9. The computer program next creates a new output line, as indicated by a step 910 shown in FIG. 9, and then a new frame upon that line, as indicated by a step 912 shown in FIG. 9. This frame is, for example, capable of containing two lines of text, and is preferably prepared to present a highly visible chunk of study text 22 on one line above and supplemented with a less visible chunk of teach text 33 on another line below. The separate texts within this frame can be presented in distinct sizes, color densities and/or colors, and typestyles, thus effecting a bitextual presentation and preferably a bitextual, bifocal presentation 333.

If the end of the study text source 222 has not been reached, as indicated by a step 914 shown in FIG. 9, the computer program locates the first line of the study text source that has not been read, as indicated by a step 916 shown in FIG. 9, and the first line of the teach text source 233 that has not been read, as indicated by a step 918 shown in FIG. 9. Typically, the first line contains text, as indicated by a step 920 shown in FIG. 9, and so, as indicated by a step 922 shown in FIG. 9, the computer program decides if the number of characters of the chunk of study text source 222 exceeds the user selected maximum output width defined by the step 908 shown in FIG. 9.

Typically, the first chunk of study text source 222 does not exceed the maximum width, so the computer program prints the first chunk of study text 22 in an easily visible format, as selected by the user, as indicated by a step 924 shown in FIG. 9. The computer program then returns to a subsequent line, as indicated by a step 926 shown in FIG. 9, typically a chunk of teach text 33 to be printed below the printed chunk of study text 22. On this subsequent line, the computer program prints the corresponding line from the teach text source 233, as indicated by a step 928 shown in FIG. 9, preferably in a less visible format, as selected by the user. Note that these associated chunks of study text 22 and teach text 33 are preferably presented in central alignment within this frame, as shown in FIG. 3. After each chunk has been printed, the computer program closes the frame, as indicated by the numeral 930 shown in FIG. 9.

The computer program then creates a new frame in horizontal alignment to the previous frame, as indicated by the step 912 shown in FIG. 9. If the end of the text has not been reached, as indicated by the step 914 shown in FIG. 9, then the next chunk of study text source 222 and the next chunk of teach text source 233 are read by the computer program, as indicated by the steps 916 and 918 shown in FIG. 9, respectively. If the combined number of characters within this chunk of study text source 222, when added to the number of characters in the previous chunk, exceeds the maximum output width as selected by the user, as determined by the step 922 shown in FIG. 9, then the computer program must format a "bitextual line break," and continue the presentation upon a subsequent line, or subsequent page.

In order to create this bitextual line break, the computer program first determines the number of characters before the maximum output width is reached, as indicated by a step 932 shown in FIG. 9. Then, the computer program applies break criteria, as indicated by a step 934 shown in FIG. 9, or decides where to interrupt the chunk of study text 22, namely, at the end of or in the middle of a single word within the chunk of study text source 222. Since the computer program must also interrupt the presentation of the chunk of teach text source 233, and in a proportion consistent with the interruption of the chunk of study text source 222, the computer program must calculate where to interrupt the corresponding chunk of teach text source.

Consequently, the computer program calculates the number of characters within a broken chunk of study text source 222 before the line break, as well as the number of study text source characters after the line break, and then creates a fraction or ratio of the two, as indicated by a step 936 shown in FIG. 9. This fraction is then applied to the chunk of teach text source 233, to identify where to interrupt the teach text source 233 in proportion to the broken chunk of study text source 222, as indicated by a step 938 shown in FIG. 9. Once applied, as indicated by a step 940 shown in FIG. 9, the computer program prints the pre-line-break portions of the chunk of study text 22 and the chunk of teach text 33, as indicated by steps 942 and 944, respectively, shown in FIG. 9, and closes the frame that contains them, as indicated by a step 946 shown in FIG. 9. The computer program next advances to the subsequent line or page of the bitextual presentation, as indicated by a step 948 shown in FIG. 9, and creates a new frame, as indicated by a step 950 shown in FIG. 9. Thereafter, the computer program prints the post-line-break portions of the bitextual line break, or the continuations of the chunk of study text 22 and chunk of teach text 33, as indicated by the steps 952, 954, and 956 shown in FIG. 9.

Then, the frame is closed, as indicated by the step 930 shown in FIG. 9, and the computer program advances to read the next lines or chunks from the text source files of study text 22 and teach text 33. If the end of the document has not been reached, as indicated by the step 914 shown in FIG. 9, and the lines in the source text files are empty, as indicated by the step 920 shown in FIG. 9, then the computer program advances to the next lines of the study source text 222, as indicated by a step 958 shown in FIG. 9.

If these lines contain text, as indicated by a step 960 shown in FIG. 9, the computer program applies a sentence criteria: typically, the computer program returns to the previously closed frame; and adds two empty spaces after the final period, as indicated by a step 962 shown in FIG. 9. The computer program then creates a new frame (upon the same line of bitextual presentation); next reads the text source lines which appear after the empty lines; and then formats a new sentence, by continuing upon the same line with a new bitextual frame.

If the computer program encounters another empty line within the sources of study and teach text, or a total of two empty lines in sequence, as indicated by the step 960 shown in FIG. 9, the computer program applies a paragraph criteria, as indicated by a step 964 shown in FIG. 9. Typically, the computer program bitextually formats an indentation and/or an empty line, and then continues the bitextual presentation, by creating a new bitextual frame, and advancing to the following chunks of study text source 222 and teach text source 233 for the study text 22 and teach text 33, respectively.

Thus, as shown in the flow chart in FIG. 9, the computer program advances, line by line, or chunk by chunk, through the text source files for the selected title of study text and the associated teach text; formats these textual associations in frames; interrupts these frames as needed to fit within the width limitation of a given medium as selected by a user; continues such interrupted chunks in subsequent frames upon subsequent lines of bitextual presentation; formats sentences when encountering one empty line in the source files; and formats paragraphs when encountering two empty lines within the source files. The process continues until the end of the document has been reached.

When the end of the document has been reached, as indicated by the step 914 shown in FIG. 9, the computer program closes an empty frame and closes the document, as indicated by a step 966 shown in FIG. 9. Finally, the computer program delivers a bitextual presentation, according to the variables and preferences selected by the user.

Note that the flow chart shown in FIG. 9 represents one method for formatting text sources which are associated and stored in computer memory according to a preferred embodiment of the present invention. Other approaches are contemplated to allow the user to automatically format the text sources as lyrics, or in a more horizontal presentation. The user can employ other approaches and thereby produce alternative presentations simply by adjusting variables via a pop-up window provided in the interface.

Thus, a user can access the interface in accordance with the present invention via a computer network, such as the Internet. The user can then select variables and preferences to customize his or her presentation; input a text along with the relevant title information, or simply direct the computer program to a specific URL; and send the text to be automatically processed by the computer program into a bitextual, preferably bitextual, bifocal, presentation in accordance with the present invention.

Since such automatic chunking and machine translation may not always accurately chunk and translate all special uses, such as idioms, it is preferable to enable qualified translators or teachers to proofread, correct, and/or amend the source texts which enable bitextual presentations to be processed. Indeed, translation is often an art of interpretation, which can vary according to specific regions and dialects. Thus, the computer program allows individual translators to produce distinctive interpretations of a single study text source 222, including how such a text might be chunked, and what associations might be related to such chunks.

As mentioned earlier, a reinterpretation, retranslation, or human input interface is accessible to a user. This human input interface allows a human translator to both regroup words in a chunked study text source 222, as well as allows the adjustment and correction of the associated teach text source 233. By correcting errors found in automatic chunking of study text sources 222, and by reinterpreting the teach text sources 233 produced by machine translation, human translators can thus amend the databases which are created, thereby potentially improving the accuracy.

This human interface is simply an approach by which a human can manually change the chunking of a study text 22, and change, amend, or even create an entirely new interpretation of teach text 33. Also, as described earlier, if no machine translation device is available to read a study text source 222 from one language and then process that text to provide a teach text source 233 in another language, then this human interface offers a qualified translator an opportunity to create or manually input such a translation or interpretation. Furthermore, if an individual user prefers not to use a machine translation device, even though one or more may be available, then such a user can easily proceed to this human input interface and produce his or her own interpretation.

Once a human translator has input chunks of teach text source 233, each specifically associated with corresponding chunks of study text source 222, the translator then submits or sends both files to be automatically stored by the computer program in the proper locations, as described above. Note that if the translator changes the study text source 222, and submits the amended text in association with the teach text source 233, then the amended study text file is updated or overwritten to include the amendments entered by the translator. Thus, the matching file names and the distinct paths leading to them, as described above, remain intact.

Consequently, the interface allows a user to either chunk a study text source 222 and provide an associated teach text source 233 manually, or to automatically do so via a selected chunk depth and a selected machine translation device. In either case, if the user is not satisfied with the resulting bitextual presentation, the interface allows the user to correct and/or amend the presentation, as will be explained in more detail below.

In the operation of the computer program, the interface also allows a user to search for previously created or already existing examples of bitextual presentations. Searching for existing examples can allow a user to review translations or interpretations that have been improved by human intervention. Such improved examples are likely to better serve a student of a particular language. Furthermore, students can become familiar with individual translators, who are identified by their unique user name, and may learn to trust their interpretations. In order to search for existing examples of bitextual presentations, the user must first select his or her preferences and variables as outlined above.

By identifying the study text language which the user intends to learn, and the teach text language which the user already understands, the computer program is instructed which folder and subfolder shown in FIG. 7 to search. In order to execute a search, a text input window is provided to allow the user to enter a specific text query. The interface provides a pop-up window which is used to search for an existing bitextual presentation by a variety of criteria: by title, by author, by owner, by translator, or by all of the above.

Clicking on a "submit" button sends the query to be processed by the computer program. Returned results can be ordered alphabetically, by popularity measured by the number of times an individual interpretation has been accessed by users, or by a variety of other criteria. The results of a search query are formatted with "hyperlinks," or highlighted text strings, which, when selected, instruct the computer program to retrieve the associated teach text sources 233, and then to format a bitextual presentation of the title. Preferably, the title is formatted in a presentation as shown in FIG. 3, and according to a procedure as described in connection with the flow chart shown in FIG. 9.

A wide variety of additional output formats are also contemplated, and can be selected as variables to instruct the computer program to produce alternate formats, as desired by an individual user. In all cases, the output formats present the associated chunks of the study text source 222 and the teach text source 233 in a bitextual presentation, preferably, the bitextual, bifocal presentation 333 shown in FIG. 3, that enhances the ability of the user to learn a study text 22.

Thus, by providing this Internet accessible interface, the computer program enables a user to search for and find existing examples of bitextual presentations, or create new presentations. In either case, the user can reinterpret the results of his or her search or creation.

Since the computer program requires users to "log in" or register when they choose to access the interface from a computer network, such as the Internet, all transactions are accounted for, and these transactions are preferably recorded in a log. Thus, for example, a teacher or translator can earn credits when his or her individual reinterpretations or translations are accessed, and a student can spend credits when accessing existing bitextual presentations.

Since translators are publicly identified by name, they are held accountable for their interpretations. Consequently, the better translators maintain their reputation for accurate translations, the more they may attract the trust and attention of students who use the bitextual presentations that are based on their translations. Thus, the present invention may engender a marketplace for the translation of texts, as well as communicate ideas across linguistic boundaries.

Within a given language, dialects and slangs can be accommodated within the interface provided by the computer program. For example, if a user considers Ebonics to be a separate dialect of English, such a user can create a main directory titled "Ebonics", which contains a subdirectory titled "English", and then, within the main directory titled "English", add a subdirectory titled "Ebonics". As an alternative, within a main directory titled "English", a subdirectory titled "Ebonics" could contain a deeper or sub-subdirectory titled "English". In this case, an English language teach text source 233 located by the path "English/Ebonics/English/title.author.owner.translator.txt" would be associated with an Ebonics language study text source 222 located by the path "English/Ebonics/title.author.owner.translator.txt".

As previously mentioned, the interface provided by the computer program for archiving the source files accommodates a large number of languages, dialects, and slangs with which users interact and produce bitextual presentations. This interactivity will likely increase as computer file systems accommodate a wider variety of the world's scripts with such initiatives as UniCode, thereby allowing the paths which lead to files to be expressed in truly multilingual text.

Consequently, the present invention may enable an unprecedented interaction between various human languages, and has a potential to provide for thriving commercial applications, in tangible forms used in commerce, such as in printed matter, and within the unfolding realm of electronic trade, or services. The media for bitextual presentations, preferably the bitextual, bifocal presentation 333 shown in FIG. 3, in practical applications may include printed matter, such as books, booklets, magazines, pamphlets, cards, individual sheets, and the like, or in electronic displays, such as CRT or LCD computer screens, video monitors, and new devices of visual display, such as electronic books, as they become available. Future software developments and integrations will allow customized books, booklets, magazines, and other printed materials to be easily produced in accordance with the method for bitextual presentation of the present invention.

In conclusion, what has been described above is a method to easily create effective language learning aids in the form of bitextual, preferably bifocal, presentations which associate specific chunks of textual meaning, and then to easily reinterpret, exchange, and distribute such presentations over a computer network, such as the Internet. Such exchanges can enable the bitextual presentation to materialize as printed matter, such as what typically occurs when a selected presentation is printed in ink on paper. In addition, bitextual presentations can be produced in electronic form, which, when integrated with computers, including those connected to a network, can empower a user to select from among a variety of software enabled interfaces and formats for presentation.

Since software development may be better defined as an evolving process, rather than as a fixed product, the foregoing description has focused simply on a method to associate related meanings between a study text source 222 and a teach text source 233 and to then store such associations within fixed paths or addresses within computer memory (including paths accessible to computer networks such as the Internet), thereby to allow software to locate and then process bitextual presentations, and thus to deliver them in the languages, in the graphical format, and on the medium of a user's selection, preference, or choice. A "language learning interface" may the phrase that aptly characterizes the computer program in accordance with one embodiment of the present invention. That is, students use the interface to access associated chunks of textual meaning, which, when formatted in bifocal chunks, are a useful aid to learn language. Translators use the interface to create and amend such associations, thereby updating databases with various interpretations. Such databases can in turn inform machine translation, which, in turn, may improve the contextual accuracy of mechanically produced chunking and translation. Thus, machine translation devices can also learn language from this interface.

Adaptation of the computer program, which locates each new chunk on a new line, locates each new sentence after one empty line, and locates each new paragraph after two empty lines, is described above to organize texts vertically. This vertical arrangement enables chunks of text so organized to be amended horizontally, with additional code in the form of a "mark-up" language. Such a language can use symbols to instruct a computer program to format a text with a variety of colors and typestyles, which can symbolize slang usages; register the formality or familiarity of certain word usages; warn students of potentially indecent words or phrases; identify grammatical categorizations, such as nouns, verbs, modifiers, conjugations, and the like; and identify idiomatic word usage, to differentiate between interpretations of "what a chunk says" and "what a chunk means."

In other words, a computer program can be configured to recognize specific symbols following an individual chunk of meaning as instructions to format the text chunk in a specific fashion. For example, within a teach text source 233, a specific chunk of teach text could be followed by a quotation mark, or a """", to instruct a computer program to format the presentation in italics, thereby informing a reader that this specific interpretation is a literal translation of a study text chunk, whereas if the chunk of teach text source is followed by an equal sign, or "=", this symbol could instruct a program to display the chunk in a bold format, thus informing a user that the specific translation is a figurative interpretation, which, within a specific context, indicates what the word means. A symbol, such as an exclamation point, or "!", when following a chunk of text source could instruct the computer program to add the color red to the output format of the specific chunk, thus informing the reader of a possibly indecent word usage. Several exclamation points could add more red color to the presentation of the specific chunk, thereby assuring a reader of an indecent word usage.

Such a mark-up language, integrated with a computer program, can enable such formatting to be included in both print and electronic media displays of bitextual presentation. Those users accessing such bitextual presentations via interactive computer interfaces can enjoy further advantages afforded by such a supplementary mark-up language. For example, additional symbols within the mark-up language can instruct a computer program to link additional textual, visual, audio, or other type of digital record in association with a chunk that has been so amended, thereby allowing a user to access a plurality of supplementary information.

Educators or translators who create examples of bitextual presentation in accordance with the present invention could use such a mark-up language to further supplement texts with their unique insights and interpretations, thus differentiating their services from other interpreters and creators of bitextual presentations.

While the vertical organization of text specifies a code which can instruct a computer program how to format chunks, sentences, and paragraphs, it is likely that these Western methods to structure grammar, language, and thought are not universal across the span of human languages. When interpreting musical lyrics or poetry, for example, translators may choose to interpret each new line as an unchunkable unit of thought. Thus, the above-described computer program accommodates these user preferences by providing an additional output option to format each new chunk upon a new line. In addition, the computer program provides users with options to produce bitextual and preferably bifocal presentations in a vertical format, as may be more suitable for certain non-Western scripts.

Further, computer programs can be tailored to read texts associated in accordance with the present invention and then format alternative graphic layouts, such as those used on the main pages of Internet search engines. Typically, such pages display main categories in a bold format, in proximity to associated subcategories displayed in a smaller format. A computer program can be configured to read the paragraph criteria identified by three returns and thus format a bitextual presentation of a bold heading; to read the sentence criteria identified by two returns and thus format a smaller bitextual presentation of subcategories; and to read a single chunk identified by one return to distinctly associate each subcategory of study text 22 with a related chunk of teach text 33.

It should be understood by persons skilled in the art that many variations of this method are possible. The use of four or five returns can instruct a computer program to process specific bitextual outputs. For example, four returns, or three empty lines, could instruct a computer program to format a bold heading, which can be used to organize topics within a longer text. Five returns, or four empty lines, could instruct a computer program to format a new chapter.

In another example, four returns could instruct a computer program to process a news headline, while five returns could instruct a program to format a line of text which gives credit to an author. A wide variety of possibilities are engendered by the description of the various embodiments of the present invention.

An alternative file system is also contemplated, which could locate a specific file within a deep hierarchy of subfolders. An example of such a file system could locate a study text source 222 in a subdirectory located in computer memory at "STUDY/owner/author/translator/title.txt", while the related teach text source 233 could be found at "STUDY/owner/author/translator/TEACH/title.txt". Any combination of "deep" subdirectories can afford an alternative filing system to track individual interpretations while enabling the processing of bitextual presentations.

It should be noted that associating chunks of texts in accordance with the method of the present invention does not preclude computer programs from reading such associations and formatting presentations according to other methods of dual text display, such as those disclosed by Cook, Krass, or Watkins. As described above, however, the bitextual, bifocal presentation 333 shown in FIG. 3 is preferred.

Additionally, one can contemplate an interface whereby a user can instruct a computer program to retrieve a chunk of teach text 33 only when the associated chunk of study text 22 is specifically selected. Such a computer program could easily locate the associated chunk of teach text 33 when stored in computer memory in accordance with the method of the present invention.

Furthermore, upon a foundation of associating texts as described above, an additional interface can be built which allows a user to select bitextual presentations which include only those chunks of study text 22 which the user has not yet learned. Such an interface would be driven by a computer program that would access an individual database of a specific user's preferences, which would allow the user to instruct the computer program not to bitextually display chunks of study text 22 which the user has already learned. Or perhaps users might prefer to instruct such a computer program to initially present an associated chunk of teach text 33 in a more visible bold format, and then format repeated presentations of the specific bitextual chunk with the teach text appearing in an increasingly fading and less visible format.

In any event, the method in accordance with the present invention for associating chunks of study text 22 and teach text 33, storing those associations in fixed locations of computer memory, thereby allowing various computer programs to graphically present such associations in a variety of presentations, such as in the preferred bitextual, bifocal presentation 333 shown in FIG. 3, in turn may prove useful to those who choose to learn new language, as an unprecedented global communications capacity spreads to an increasing percentage of the world's population.

While the invention has been disclosed in connection with preferred embodiments, it is not intended to be limited to the specific embodiments set forth above. For example, although the preferred embodiment of the present invention enables a user to access the computer program via the global computer network, or Internet, other versions can be adapted to function within a single computer. Accordingly, the present invention is intended to include such alternatives and equivalents as may fall within the scope of the claims set forth below.

What is claimed is:

1. A language learning system for presenting a text in a first language to be learned by a person, the text in the first language being presented in a bitextual format to facilitate learning the first language, the system comprising:

a study text based on the text in the first language, the study text being produced by dividing the text in the first language into associated chunks of meaning corresponding to units of thought; and a teach text provided in a second language that is known to the person, the teach text being divided into chunks of meaning corresponding to the chunks of meaning of the study text, each chunk of the teach text being provided to relate the meaning of the associated chunk of the study text;

the study text having attributes that render the study text readily perceptible to the person and the teach text having attributes that render the teach text substantially imperceptible to the person when the person reads the study text, without requiring eyeglasses, the associated chunks of study text and teach text being in separate focal planes, the study text having a first size and being in a first focal plane and the teach text being in a second size smaller than the first size and thereby being in a second focal plane;

whereby the person can easily focus on the study text when viewed from a comfortable reading distance while forcing the person to physically move closer to refocus when in need of explanatory information supplied by the teach text.

2. The system as defined in claim 1 wherein the height of the study text is approximately three to nine times the height of the teach text.

3. The system as defined in claim 1 wherein the shade of the study text is one of a) approximately two to fifty times more dense that the shade of the teach text, when the two texts are presented on a light-colored background, and b) approximately two to fifty times less dense than the shade of the teach text, when the two texts are presented on a dark-colored background.

4. The system as defined in claim 1 wherein the study text has a first color and the teach text has a second color, the first color being one of a) approximately two to fifty times darker than the second color, when the two texts are presented on a light-colored background, and b) approximately two to fifty times lighter than the second color, when the two texts are presented on a dark-colored background.

5. The system as defined in claim 4 wherein the background is light-colored and the first color is black and the second color is non-photo blue.

6. The system as defined in claim 1 wherein the person can adjust at least one of the shades, colors, fonts, and sizes of the study text and the teach text to control the relative visibility of the two texts in the bitextual presentation.

7. The system as defined in claim 1 wherein each chunk of the teach text is positioned beneath and centered with respect to the associated chunk of the study text.

8. The system as defined in claim 7 wherein the study text is presented in a normal format and the nominal size of the teach text is selected so that unnatural gaps do not appear in the study text.

9. The system as defined in claim 7 wherein at least one chunk of the study text is interrupted by a line break forced by a limited width of a given medium of presentation and the associated chunk of the teach text is also interrupted, and divided proportionally, so that if the line break and its continuation on a subsequent line were to be reassembled on a single line, the reassembled chunk of the teach text would be centered directly beneath the associated recombined chunk of the study text.

10. The system as defined in claim 9 wherein a chunk of the teach text, when interrupted by a line break, is aligned to the right edge of its associated and interrupted chunk of study text, and then when continued in the subsequent line, the teach text is aligned to the left edge of the continuation of the interrupted chunk of study text.

11. The system as defined in claim 1, further comprising computer memory to store each chunk of the study text and related chunk of the teach text in a file structure which permits a computer program to locate and process the related chunks of study and teach text to produce the bitextual presentation automatically.

12. The system as defined in claim 11 wherein the study text is separated into chunks by the insertion of one return after each chunk, into sentences by the insertion of two returns after each sentence, and into paragraphs by the insertion of three returns after each paragraph, thereby allowing an individual teach text to provide a corresponding translation for each line of study text.

13. The system as defined in claim 11 wherein a chunked study text file and corresponding chunked teach text file are given the same name, but stored in different folders, thereby allowing a computer program to locate and access the associated files.

14. The system as defined in claim 1, further comprising an authoring interface to provide a translator access to the text in the first language and to the chunks of the study text and the teach text to enable the study text to be rechunked and the teach text to be modified.

15. The system as defined in claim 1, further comprising a network connection to enable the bitextual presentation to be distributed over a computer network.

16. The system as defined in claim 15 wherein the computer network is the Internet.

17. The system as defined in claim 1, further comprising a computer program to account for access to the bitextual presentation.

18. The system as defined in claim 1, further comprising a computer program to automatically process the text in the first language to produce chunks of study text based on preselected chunk depth criteria.

19. The system as defined in claim 18, further comprising an interface accessible by a user to vary the chunk depth criteria.

20. The system as defined in claim 1, further comprising a network connection to enable the computer program to obtain text in the first language from a designated site.

21. The system as defined in claim 19 wherein the computer program accesses a machine translation device which processes the chunks of the study text to produce corresponding chunks of the teach text.

22. The system as defined in claim 21, further comprising an authoring interface to provide a translator access to the teach text to enable the teach text to be modified.

23. The system as defined in claim 19, further comprising an authoring interface to provide a translator access to the study text to enable the translator to rechunk the study text.

24. The system as defined in claim 1, further comprising a computer program to advance chunk by chunk through the study text and the associated teach text, to format the textual associations in frames, to interrupt these frames as needed to fit within the width limitation of a given medium, to continue interrupted chunks in subsequent frames upon subsequent lines of bitextual presentation, to format sentences when encountering one empty line, and to format paragraphs when encountering two empty lines, until the end of the text in the first language has been reached.

25. The system as defined in claim 19, further comprising a second computer program to advance chunk by chunk through the study text and the associated teach text, to format the textual associations in frames, to interrupt these frames as needed to fit within the width limitation of a given medium, to continue interrupted chunks in subsequent frames upon subsequent lines of bitextual presentation, to format sentences when encountering one empty line, and to format paragraphs when encountering two empty lines, until the end of the text in the first language has been reached.

* * * * *